US012492129B2

(12) United States Patent
Bengtsson et al.

(10) Patent No.: US 12,492,129 B2
(45) Date of Patent: Dec. 9, 2025

(54) HIGHLY STRUCTURED POROUS SILICA MATERIALS AND BIOLOGICAL USES THEREOF

(71) Applicant: Sigrid Therapeutics AB, Stockholm (SE)

(72) Inventors: Tore Bengtsson, Vaxhoim (SE); Eric Johnston, Stockholm (SE); Muhammad Naeem Iqbal, Stockholm (SE)

(73) Assignee: Sigrid Therapeutics AB, Stockholm (SE)

( * ) Notice: Subject to any disclaimer, the term of this patent is extended or adjusted under 35 U.S.C. 154(b) by 832 days.

(21) Appl. No.: 17/435,150

(22) PCT Filed: Mar. 1, 2019

(86) PCT No.: PCT/EP2019/055219

§ 371 (c)(1), (2) Date: Aug. 31, 2021

(87) PCT Pub. No.: WO2019/166656

PCT Pub. Date: Sep. 6, 2019

(65) Prior Publication Data

US 2022/0135411 A1 May 5, 2022

(51) Int. Cl.

*C01B 33/18* (2006.01)
*A23L 2/52* (2006.01)
*A23L 33/16* (2016.01)
*A61K 9/14* (2006.01)
*A61K 33/00* (2006.01)
*A61P 3/04* (2006.01)
*A61P 3/06* (2006.01)
*A61P 3/10* (2006.01)

(52) U.S. Cl.

CPC ................ *C01B 33/18* (2013.01); *A23L 2/52* (2013.01); *A23L 33/16* (2016.08); *A61K 9/14* (2013.01); *A61K 33/00* (2013.01); *A61P 3/04* (2018.01); *A61P 3/06* (2018.01); *A61P 3/10* (2018.01); *A23V 2002/00* (2013.01); *C01P 2002/72* (2013.01); *C01P 2004/03* (2013.01); *C01P 2004/61* (2013.01); *C01P 2004/62* (2013.01); *C01P 2006/12* (2013.01); *C01P 2006/16* (2013.01)

(58) Field of Classification Search

CPC . C01B 33/18; A23L 33/16; A23L 2/52; A61P 3/04; A61P 3/06; A61P 3/10; A61K 9/14; A61K 33/00; A23V 2002/00; C01P 2002/72; C01P 2004/03; C01P 2004/61; C01P 2004/62; C01P 2006/12; C01P 2006/16

See application file for complete search history.

(56) References Cited

U.S. PATENT DOCUMENTS 8,097,286 B2 1/2012 Samuel et al.
8,258,137 B2 9/2012 Augustijns et al.
8,563,051 B2 10/2013 Samuel et al.
2009/0192205 A1 7/2009 Augustijns et al.
2013/0059817 A1 3/2013 Chong et al.
2015/0258028 A1* 9/2015 Csikasz .................. A23L 33/30 424/724
2017/0360715 A1 12/2017 Alderborn et al.

FOREIGN PATENT DOCUMENTS

MX 2010001670 A 3/2010
WO 2005/000740 A2 1/2005
WO 2014/072363 A1 5/2014
WO 2016/145335 A1 9/2016

OTHER PUBLICATIONS

Kuang et al.; Hierarchical Porous Silica Materials with a Trimodal Pore System Using Surfactant Templates; ACS Publications; J. Am. Chem. Soc. 2004, 126, 10534-10535 (Year: 2004).*
Areva et al.; One-pot aerosol synthesis of ordered hierarchical mesoporous core-shell silica nanoparticles; Royal Society of Chemistry; Chem. Commun., 2004, 1630-1631 (Year: 2004).*
Kuang et al.; Hierarchical Porous Silica Materials with a Trimodal Pore System Using Surfactant Templates; ACS Publications; JACS, 2004, 126, 10534-10535. (Year: 2004).*
Onizhuk et al.; Dissociation Constants of Silanol Groups of Silic Acids: Quantum Chemical Estimations; Pleiades Publishing. Ltd.; Journal of Structural Chemistry, vol. 59, No. 2, 261-271, 2018. (Year: 2018).*
Kim et al.; Control of hydroxyl group content in silica particle synthesized by the sol-precipitation process; Elsevier; Ceramics International, 35, 2009, 1015-1019. (Year: 2009).*
Google Search; cylindrical pore model (accessed Mar. 2025) (Year: 2025).*
American Diabetes Association, Understanding A1C, Diagnosis. Retrieved online at: https://www.diabetes.org/a1c/diagnosis. 6 pages, (2021).
Aranceta et al., Recommended dietary reference intakes, nutritional goals and dietary guidelines for fat and fatty acids: a systematic review. Br J Nutr. Jun. 2012;107 Suppl 2:S8-22.

(Continued)

*Primary Examiner* — Robert A Wax
*Assistant Examiner* — John W Lippert, III
(74) *Attorney, Agent, or Firm* — McCarter & English, LLP; Michael J. DeGrazia

(57) ABSTRACT

There is provided herein a porous silica particle characterized by having a hierarchical pore structure wherein at least about 20% of the pores of the silica particle are of a size in the range of from about 7.0 to about 13.0 nm, and at least about 10% of the pores of the silica particle are of a size in the range of from about 0.5 to about 5.0 nm, and by having a particle size of from about 0.1 μm to about 10.0 μm. There is also provided compositions comprising such silica particles, process for their preparation, and medical and non-medical uses thereof.

20 Claims, 7 Drawing Sheets

(56) References Cited

OTHER PUBLICATIONS

Atluri et al., Nonsurfactant supramolecular synthesis of ordered mesoporous silica. J Am Chem Soc. Mar. 11, 2009;131(9):3189-91.
Bennett et al., HbA(1c) as a screening tool for detection of Type 2 diabetes: a systematic review. Diabet Med. Apr. 2007;24(4):333-43.
Berg et al., The Complex Regulation of Cholesterol Biosynthesis Takes Place at Several Levels. Biochemistry, 5th Edition. W.H. Freeman, New York. Section 26.3, 9 pages, (2002).
Brunauer et al., Adsorption of Gases in Multimolecular Layers. J Am Chem Soc. 1938;60(2):309-19.
Cao et al., Facile method to synthesize platelet SBA-15 silica with highly ordered large mesopores. J Colloid Interface Sci. Sep. 15, 2011;361(2):472-6.
Carlton-Menys et al., Human cholesterol metabolism and therapeutic molecules. Exp Physiol. 2007;93(1):27-42.
Ding et al., A convenient route to synthesize SBA-15 rods with tunable pore length for lysozyme adsorption. Microporous and Mesoporous Materials. 2013;170:45-51.
Ernst et al., Consistency between US dietary fat intake and serum total cholesterol concentrations: the National Health and Nutrition Examination Surveys. Am J Clin Nutr. Oct. 1997;66(4 Suppl):965S-972S.
European Centre for Ecotoxicology and Toxicology of Chemicals, Synthetic Amorphous Silica (CAS No. 7631-86-9). JACC No. 51. 237 pages, Sep. 2006.
European Pharmacopoeia, Silica Colloidal Anhydrous, Silica colloidalis anhydrica. Sixth edition. Retrieved online at: http://www.uspbpep.com/ep60/silica%20colloidal%20hydrated%200738e.pdf. pp. 2877-2878, Jan. 2008.
FDA, Cholesterol from you. Cholesterol and statin infographic. Retrieved online at: https://www.fda.gov/drugs/drug-safety-and-availability/cholesterol-and-statins-infographic. 4 pages, May 22, 2015.
Galarneau et al., Microporosity and connections between pores in SBA-15 mesostructured silicas as a function of the temperature of synthesis. New J Chem. 2003;27:73-79.
Galarneau et al., True Microporosity and Surface Area of Mesoporous SBA-15 Silicas as a Function of Synthesis Temperature. Langmuir. 2001;2017:8328-8335.
Gandhi et al., In-situ generation of large microporous skeleton in mesoporous silica framework using different dicarboxylic acids. J Porous Mater. 2014;21:53-62.
Golomb et al., Statin adverse effects: a review of the literature and evidence for a mitochondrial mechanism. Am J Cardiovasc Drugs. 2008;8(6):373-418.
Guillet-Nicolas et al., Selectively Tuned Pore Condensation and Hysteresis Behavior in Mesoporous SBA-15 Silica: Correlating Material Synthesis to Advanced Gas Adsorption Analysis. J Phys Chem C. 2017;121:24505-24526.
Huang et al., Association between prediabetes and risk of cardiovascular disease and all cause mortality: systematic review and meta-analysis. BMJ. Nov. 23, 2016;355:I5953, 11 pages.
International Diabetes Federation, IDF Diabetes Atlas, Seventh Edition. Retrieved online at: https://www.diabetesatlas.org/upload/resources/previous/files/7/IDF%20Diabetes%20Atlas%207th.pdf. 140 pages, (2015).
Jammaer et al., Convenient synthesis of ordered mesoporous silica at room temperature and quasi-neutral pH. J Mater Chem. 2009;19:8290-8293.
Jaroniec et al., Standard Nitrogen Adsorption Data for Characterization of Nanoporous Silicas. Langmuir. 1999;15:5410-5413.
Jones, Regulation of cholesterol biosynthesis by diet in humans. Am J Clin Nutr. Aug. 1997;66(2):438-46.
Jun et al., Synthesis of New, Nanoporous Carbon wtih Hexagonally Ordered Mesostructure. J Am Chem Soc. 2000;122:10712-10713.
Kerkhofs et al., Self-Assembly of Pluronic F127-Silica Spherical Core-Shell Nanoparticles in Cubic Close-Packed Structures. Chem Mater. Aug. 11, 2015;27(15):5161-5169.
Kim et al., Non-ionic surfactant assembly of wormhole silica molecular sieves from water soluble silicates. Chem Commun. 2000:835-836.
Kim et al., Synthesis of highly ordered mesoporous silica materials using sodium silicate and amphiphilic block copolymers. Chem Commun. 2000;1159-1160.
Kim et al., Non-ionic surfactant assembly of ordered, very large pore molecular sieve silicas from water soluble silicates. Chem Commun. pp. 1661-1662, (2000).
Kreisberg et al., Changing the relation between micro- and mesoporosity in porous glasses: The effect of different factors. Microporous and Mesoporous Materials. 2014;190:128-138.
Kruk et al., Characterization of the Porous Structure of SBA-15. Chem Mater. 2000;12(7):1961-8.
Kupferschmidt et al., Large pore mesoporous silica induced weight loss in obese mice. Nanomedicine. doi:10.2217/NNM.13.138. 9 pages, (2013). prepublication edition.
Landers et al., Density functional theory methods for characterization of porous materials. Colloids and Surfaces A: Physiochem Eng Aspects. 2013;437:3-32.
Lind et al., A systematic review of HbA1c variables used in the study of diabetic complications. Diabetes & Metabolic Syndrome: Clinical Research & Reviews. 2008;2:282-293.
Liu et al., An HREM Study of Channel Structures in Mesoporous Silica SBA-15 and Platinum Wires Produced in the Channels. ChemPhysChem. 2001;4:229-231.
Lukens et al., Evaluating Pore Sizes in Mesoporous Materials: A Simplified Standard Adsorption Method and a Simplified Broekhoff-de Boer Method. Langmuir. 1999;15:5403-5409.
Mancini et al., Diagnosis, prevention, and management of statin adverse effects and intolerance: proceedings of a Canadian Working Group Consensus Conference. Can J Cardiol. Sep.-Oct. 2011;27(5):635-62.
Mathers et al., Projections of global mortality and burden of disease from 2002 to 2030. PLoS Med. Nov. 2006;3(11):e442, 20 pages.
Mayo Clinic Staff, Metabolic syndrome. Mayo Clinic. Retrieved online at: https://www.mayoclinic.org/diseases-conditions/metabolic-syndrome/symptoms-causes/syc-20351916#dialogId15191747. 3 pages, May 6, 2021.
Mayo Clinic Staff, Statin side effects: Weigh the benefits and risks. Mayo Clinic. Retrieved online at: https://www.mayoclinic.org/diseases-conditions/high-blood-cholesterol/in-depth/statin-side-effects/art-20046013. 3 pages, May 11, 2019.
Mccusker et al., IUPAC Nomenclature for Ordered Microporous and Mesoporous Materials and its Application to Non-zeolite Microporous Mineral Phases. Reviews in Mineralogy & Geochemistry. 2005;57:1-16.
Moin et al., Metformin prescription for insured adults with prediabetes from 2010 to 2012: a retrospective cohort study. Ann Intern Med. Apr. 21, 2015;162(8):542-8.
Nathan et al., The diabetes control and complications trial/epidemiology of diabetes interventions and complications study at 30 years: overview. Diabetes Care. 2014;37(1):9-16.
Olivier et al., Determination of Pore Size Distribution from Density Functional Theory: A Comparison of Nitrogen and Argon Results. Studies in Surface Science and Catalysis. 1994;87:81-9.
Olivier, Modeling Physical Adsorption on Porous and Nonporous Solids Using Density Functional Theory. Journal of Porous Materials. 1995;2:9-17.
Phan et al., Immobilised lipase for in vitro lipolysis experiments. J Pharm Sci. Apr. 2015; 104(4):1311-8.
Ravikovitch et al., Characterization of Micro- and Mesoporosity in SBA-15 Materials from Adsorption Data by the NLDFT Method. J Phys Chem B. 2001;105:6817-6823.
Ryoo et al., Block-Copolymer-Templated Ordered Mesoporous Silica: Array of Uniform Mesopores or Mesopore-Micropore Network? J Phys Chem B. 2000; 104:11465-11471.
Schmitt et al., Outset of the Morphology of Nanostructured Silica Particles during Nucleation Followed by Ultrasmall-Angle X-ray Scattering. Langmuir. May 24, 2016;32(20):5162-72.
Siemens, Quick Reference Guide. DCA Vantage Analyzer, Hemoglobin A1C. 2 pages. Retrieved Feb. 12, 2018.

(56) References Cited

OTHER PUBLICATIONS

Sing, Reporting Physisorption Data for Gas/Solid Systems with Special Reference to the Determination of Surface Area and Porosity. Pure & Appl Chem. 1982;54(11):2201-2018.
Sing, Reporting Physisorption Data for Gas/Solid Systems with Special Reference to the Determination of Surface Area and Porosity. Pure & Appl Chem. 1985;57(4):603-619.
Tonelli et al., Efficacy of statins for primary prevention in people at low cardiovascular risk: a meta-analysis. CMAJ. Nov. 8, 2011;183(16):E1189-E1202.
Vallet-Regi et al., Mesoporous materials for drug delivery. Angew Chem Int Ed Engl. 2007;46(40):7548-58.
Wang et al., Mesoporous silica nanoparticles in drug delivery and biomedical applications. Nanomedicine. Feb. 2015;11(2):313-27.
Ward et al., A systematic review and economic evaluation of statins for the prevention of coronary events. Health Technology Assessment. 2007;11(14):1-5.
WHO, Global Report on Diabetes. World Health Organization. Retrieved online at: https://www.who.int/publications/i/item/9789241565257. 88 pages, Apr. 21, 2016.
Yiu et al., Size selective protein adsorption on thiol-functionalised SBA-15 mesoporous molecular sieve. Phys Chem Chem Phys. 2001;3:2983-2985.
Zhao et al., Nonionic Triblock and Star Diblock Copolymer and Oligomeric Surfactant Syntheses of Highly Ordered, Hydrothermally Stable, Mesoporous Silica Structures. J Am Chem Soc. 1998;120:6024-6036.
Zhao et al., Triblock copolymer syntheses of mesoporous silica with periodic 50 to 300 angstrom pores. Science. Jan. 23, 1998;279(5350):548-52.
Areva et al., One-pot aerosol synthesis of ordered hierarchical mesoporous core-shell silica nanoparticles. Chem Commun (Camb). Jul. 21, 2004;(14):1630-1.
Kuang et al., Hierarchical porous silica materials with a trimodal pore system using surfactant templates. J Am Chem Soc. Sep. 1, 2004;126(34):10534-5.
International Search Report and Written Opinion for Application No. PCT/EP2019/055219, dated Jun. 17, 2019, 10 pages.

* cited by examiner

HIGHLY STRUCTURED POROUS SILICA MATERIALS AND BIOLOGICAL USES THEREOF

CROSS-REFERENCE TO RELATED APPLICATIONS

This application is a U.S. national stage filing, under 35 U.S.C. § 371 (c), of International Application No. PCT/EP2019/055219, filed on Mar. 1, 2019.

FIELD OF THE INVENTION

The present invention relates to novel materials, compositions comprising such materials, and the use of such materials and compositions comprising the same in medicine.

In particular, the present invention relates to novel, highly structured porous silica particles, and to the use compositions comprising such particles in methods for the treatment or prophylaxis of metabolic diseases and disorders, such as prediabetes, type 2 diabetes, dyslipidaemia and obesity. It also relates to the use of such compositions in methods for delaying degradation of food and reducing uptake of biomolecules into the body from the digestive system.

The present invention also provides processes for the preparation of the novel, highly structured porous silica particles.

BACKGROUND OF THE INVENTION

The listing or discussion of any prior-published document in this specification should not necessarily be taken as an acknowledgement that the document is part of the state of the art or is common general knowledge.

Metabolism is the sum of all energetic processes in the body and metabolic disorders disrupt normal metabolism, including the process of converting food to energy. A metabolic disorder occurs when abnormal chemical reactions in the body disrupt the process of metabolism. There are different groups of disorders. Some affect the breakdown of amino acids, carbohydrates, or lipids. Another group, mitochondrial diseases, affects the parts of the cells that produce the energy. Metabolic disorders can be categorised as either primary (genetic) or secondary (relating to lifestyle and environment among others).

Metabolic syndrome is a medical term that defines a clustering of at least three of the five following medical conditions: abdominal obesity, high blood pressure, high blood sugar, high serum triglycerides and low high-density lipoprotein (HDL) levels, such that the conditions occur together. Metabolic syndrome is indicative of an increased risk of cardiovascular diseases and type 2 diabetes.

Diabetes is the most common metabolic disease. There are two main types of diabetes: type 1 and type 2. Both types of diabetes are chronic diseases that affect the way the body regulates blood sugar (glucose). There is a strong genetic (hereditary) factor involved in the development of type 1 diabetes. There are several causes of type 2 diabetes, including genetics and lifestyle choices.

Prior to developing type 2 diabetes, patients suffer from a medical condition called prediabetes. Prediabetes is characterized by elevated blood sugar (glucose) levels above what is considered normal, but not high enough to be classified as type 2 diabetes. Prediabetes is a high-risk state for developing type 2 diabetes. If left untreated, 15-30% of people with prediabetes will develop type 2 diabetes within five years (U.S. Department of Health and Human Services, Centers for Disease Control and Prevention (2014)). The number of individuals with prediabetes is expected to grow substantially and estimated to globally affect 482 million people by 2040.

There are currently no approved medical treatments in the guidelines for prediabetes. The standard of care for prediabetes management is lifestyle intervention. Prediabetic patients are managed by primary care where they are recommended to exercise and eat healthily. Lifestyle intervention has a low compliance rate, with only 10-20% of patients able to implement a new lifestyle. Thus, there is currently a major unmet clinical need for treatment of prediabetes, with only 3.7% of prediabetics currently considered to be suitable for treatment with metformin (see Moin, T. et al., *Ann. Intern. Med.,* 162, 542 (2015)).

According to the US Centers for Disease Control and Prevention, rates of type 2 diabetes have tripled in the past 30 years. This is caused largely by the global epidemic of obesity, a major risk factor for developing type 2 diabetes and prediabetes. Obesity is defined as abnormal or excessive fat accumulation that may impair health. At a fundamental level, obesity occurs when, over time, the body takes in more calories than it burns. Obesity increases the risk of developing a number of chronic diseases, including: insulin resistance, type 2 diabetes, high blood pressure, high cholesterol, stroke, heart attacks, sleep apnea, congestive heart failure, osteoarthritis and cancer. In particular, high levels of cholesterol and lipids (lipid disorders) have been associated with cardiovascular diseases as well as atherosclerosis.

Dyslipidaemia is regarded as a metabolic disease, being defined as an abnormal amount of lipids (e.g. cholesterol and/or fat) in the blood. This is often due to diet and lifestyle.

Cardiovascular disease is often grouped with metabolic disorders because it is frequently a consequence of diabetes and dyslipidaemia.

Statins are the most widely used lipid lowering drug for prevention of coronary diseases in high risk patients. There are however controversies regarding their positive effects in preventing death and cardiovascular diseases in low and moderate risk patients (Tonelli, M., *CMAJ,* 183, 1189-1202 (2011); Ward, S., *Health Technol Assess.,* 1-160 (2007)). Furthermore, there is a large number of intolerant patients who experience discomforts such as liver damage, neurological effects and muscle pains (see, for example, https://www.mayoclinic.org/diseases-conditions/high-blood-cholesterol/in-depth/statin-side-effects/art-20046013, and Beatrice A. G., et al., *American Journal of Cardiovascular Drugs,* 8(6), 373-418 (2008)). The latter is the major side effect limiting the use of statins (Martini, J. et al., *Canadian J of Cardiology,* 27, 635-662 (2011)). Hence, there is a need for new and more efficient lipid lowering treatment alternatives with and without the combination of lipid lowering drugs.

In view of the above, it is clear that there is a major drive for the development of new initiatives, medicines and medical technologies that offer effective, fast-acting and safer prevention and treatment methods to delay and treat prediabetes, diabetes and their related diseases.

It has previously been shown that silica particles can lower adipose tissue in animal model systems (see WO 2014/072363 and Kupferschmidt, N. et al., *Nanomedicine,* 9(9), 1353-1362 (2014)). Animals receiving large pore mesoporous silica with a high-fat diet showed a significant reduction in body weight and body fat composition, with no observable negative effects. In particular, the authors propose the use of such silica for reduction of body weight and body fat composition as a means for the treatment of obesity. However, the treatment of obesity is a secondary way to treat prediabetes and type 2 diabetes. It would be beneficial to be able to directly target lipid and blood glucose levels in treatment, since these factors are a direct cause of type 2 diabetes and cardiovascular diseases.

Porous silica particles are thermally and chemically stable, and are exclusively composed of pure silicon dioxide. They possess an ordered porosity with controllable pore dimensions, which give them high surface areas and large total pore volume. These properties, amongst others such as stability and biocompatibility, make them suitable for biomedical applications (Wang, Y. et al., *Nanomedicine Nanotechnology, Biol. Med.* 11, 313-327 (2015)). Moreover, similar materials have previously been approved as food additives (European Center for Ecotoxicology and Toxicology of Chemicals Synthetic Amorphous Silica (CAS No. 7631-86-9), JACC No. 51, page 14 (ECETOC, 2006)).

DETAILED DESCRIPTION OF THE INVENTION

It has unexpectedly been found that certain novel silica particles are able to effectively act as molecular sieves for biological molecules in vivo, and thus have properties rendering them useful for the treatment or prevention of metabolic diseases and disorders, such as in the direct treatment or prophylaxis of prediabetes and type 2 diabetes, and in the treatment and prophylaxis of obesity.

Specifically, porous silica particles according to the present invention have been designed to possess certain physiochemical properties, as herein described, allowing for potent biological activity. Control of certain particle properties, such as pore size, pore size distribution and particle size, has been unexpectedly found to cause useful biological effects in a broad sense, including acting both on carbohydrate and lipid homeostasis as well as energy uptake.

Novel Materials

In a first aspect of the invention, there is provided a porous silica particle characterized by having a hierarchical pore structure wherein:

(a) at least about 20% of the pores of the silica particle are mesopores of a size in the range of from about 7.0 to about 13.0 nm; and (b) at least about 10% of the pores of the silica particle are lateral pores of a size in the range of from about 0.5 to about 5.0 nm, and by having a particle size of from about 0.1 μm to about 10.0 μm.

For the avoidance of doubt, the skilled person will understand that references herein to particular aspects of the invention (such as the first aspect of the invention) will include references to all embodiments and particular features thereof, which embodiments and particular features may be taken in combination to form further embodiments and features of the invention.

For the avoidance of doubt, the silica particles as defined in the first aspect of the invention may also be referred to as "the silica (material or particles) of the invention (or the first aspect of the invention)," or the like.

Unless indicated otherwise, all technical and scientific terms used herein will have their common meaning as understood by one of ordinary skill in the art to which this invention pertains.

When used herein in relation to a specific value (such as an amount), the term "about" (or similar terms, such as "approximately") will be understood as indicating that such values may vary by up to 10% (particularly, up to 5%, such as up to 4%, 3%, 2% or 1%) of the value defined. It is contemplated that, at each instance, such terms may be replaced with the notation "±10%", or the like (or by indicating a variance of a specific amount calculated based on the relevant value). It is also contemplated that, at each instance, such terms may be deleted.

For the avoidance of doubt, the skilled person will understand that where percentages of a certain feature are defined as belonging to different (i.e. non-overlapping) groups, the sum of these percentages cannot exceed 100%. Similarly, where it is possible for such features to belong to other, non-specified groups, there is no requirement for the sum of the specified features to equal 100%.

The skilled person will understand that references herein to pores being of a certain size will refer to the average diameter of the relevant pores (i.e. the average diameter of each individual pore, considering the dimensions thereof). For the avoidance of doubt, the skilled person will understand that references to average pore size may refer in particular to the average size of the opening of each pore (or, in the case of a pore the channel of which internally traverses the body of the particle, the average size taking account of all openings to the pore(s)). The skilled person will understand that this pore size may be measured by nitrogen sorption and calculated using the Density Functional Theory (see, for example, John, L. et al., *Colloids and Surfaces A: Physicochem. Engineering Aspects,* 437, 3-32 (2013)). As such, references herein to pore size may refer to pore size as measured by nitrogen sorption and calculated using the Density Functional Theory (DFT). Alternatively, pore size may be measured through visualization of such pores using appropriate microscopy techniques, such as by using Transmission Electron Microscopy (TEM).

The skilled person will understand that references to the percentage of pores present being in a particular range may be understood to be references to the pore size distribution (PSD) of such particles. As such, references to the percentage of pores present being in a particular range will refer to the number of pores present in each range as a percentage of the total number of pores present.

The skilled person will understand that each pore will comprise a channel within the particle, i.e. a channel extending from the pore opening into the body of the particle. In particular, the skilled person will understand that such channels (more particularly, such channels as forming part of mesopores as described herein) may, in particular embodiments, be referred to as being substantially uniform along the length of the channel (i.e. from the opening to the terminus of the pore, or from a first opening to a second or further opening(s)). In this regard, by "substantially uniform" it will be understood that the dimensions of the internal cross section of the channel should vary by no more than 30% (e.g. no more than 20% or no more than 10%, such as no more than 5%) in relation to the cross section at the opening. For example, in such instances, a pore having mesopores with a pore size of 11.0 nm diameter will have a channel of substantially 11.0 nm diameter (i.e. 11.0 nm diameter±30%). For the avoidance of doubt, such pores having substantially uniform channels may also be referred to as being structurally ordered. In particular embodiments, such channels will be substantially uniform in having a circular cross-section (e.g. a cross-section that appears to be substantially circular upon spectroscopic inspection).

For the avoidance of doubt, references to particles having a particular average pore size may in certain instances include references to pores that are functionally equivalent (e.g. when utilised in the manner described herein) with particles having such average pore sizes.

The skilled person will understand that pore size distribution of pores ≤50 nm diameter (i.e. lateral pores and mesopores as defined herein) in the silica material may be measured using DFT pore size distribution curves, which is a technique well-understood by those skilled in the art (see, for example, Olivier, J. P., Conklin, W. B. and Szombathely, M. V., *Studies in Surface Science and Catalysis,* 87, 81-89 (1994)). The percentage of the pores are calculated from the DFT cumulative pore size distribution curves.

In particular embodiments, the porous silica particle of the first aspect of the invention (and, similarly, individual particles present in pluralities of such particles, such as in formulations and compositions comprising the same) may be described as being substantially free of (e.g. having no detectable number of) pores having >50 nm diameter (i.e. macropores).

In particular embodiments, the pores described at point (a) (i.e. the pores referred to at point (a) in the first aspect of the invention) are of a size in the range of from about 8.0 to about 13.0 nm.

In more particular embodiments, the pores described at point (a) are of a size in the range of from about 8.0 to about 12.0 nm.

In more particular embodiments, the pores described at point (a) are of a size in the range of from about 8.0 to about 11.0 nm.

In alternative embodiments, the pores described at point (a) are of a size in the range of from about 7.0 to about 12.0 nm.

In yet more particular embodiments, the pores described at point (a) are of a size in the range of from about 9.0 to about 12.5 nm.

In yet more particular embodiments, the pores described at point (a) are of a size in the range of from about 9.0 to about 12.0 nm.

In yet more particular embodiments, the pores described at point (a) are of a size in the range of from about 9.0 to about 11.5 nm.

In yet more particular embodiments, the pores described at point (a) are of a size in the range of from about 9.0 to about 11.0 nm.

In yet more particular embodiments, the pores described at point (a) are of a size in the range of from about 9.0 to about 10.6 nm.

In the most particular embodiments, the pores described at point (a) are of a size in the range of from about 9.0 to about 10.2 nm.

In particular embodiments of the first aspect of the invention, at least 21% (such as at least at least 22%, at least 23% or at least 24%) of the pores are as described at point (a).

In more particular embodiments of the first aspect of the invention, at least about 25% of the pores are as described at point (a).

In particular embodiments, a maximum of about 70% of the pores are as described at point (a).

For example, in certain embodiments, from about 20% to about 70% (or, particularly about 25% to about 70%) of the pores are as described at point (a).

In yet more particular embodiments of the first aspect of the invention, at least about 30% (e.g. about 30% to about 70%) of the pores are as described at point (a).

In yet more particular embodiments of the first aspect of the invention, at least about 35% (e.g. about 35% to about 70%) of the pores are as described at point (a).

In yet more particular embodiments of the first aspect of the invention, about 39% to about 59% (or about 40% to about 60%) of the pores are as described at point (a).

For example, in certain embodiments of the first aspect of the invention, about 49% of the pores are as described at point (a).

In particular embodiments of the first aspect of the invention, about 40% to about 75% of the pores are as described at point (a).

In more particular embodiments of the first aspect of the invention, about 40% to about 70% of the pores are as described at point (a).

In yet more particular embodiments of the first aspect of the invention, about 50% (or about 55%) to about 70% of the pores are as described at point (a).

In yet more particular embodiments of the first aspect of the invention, about 59% to about 66% of the pores are as described at point (a).

For example, in particular embodiments of the first aspect of the invention, about 66% of the pores are as described at point (a).

In more particular embodiments of the first aspect of the invention, about 48% to about 63% of the pores are as described at point (a).

In yet more particular embodiments of the first aspect of the invention, about 50% to about 61% of the pores are as described at point (a).

In particular embodiments of the first aspect of the invention, the pores described at point (b) (i.e. the pores referred to at point (b) in the first aspect of the invention) are of a size in the range of from about 0.5 to about 4.0 nm.

In more particular embodiments of the first aspect of the invention, the pores described at point (b) are of a size in the range of from about 0.5 to about 3.5 nm.

In yet more particular embodiments of the first aspect of the invention, the pores described at point (b) are of a size in the range of from about 0.5 to about 3.0 nm.

In yet more particular embodiments of the first aspect of the invention, the pores described at point (b) are of a size in the range of from about 0.5 to about 2.5 nm.

For example, in certain embodiments of the first aspect of the invention, the pores described at point (b) are of a size in the range of from about 0.5 to about 2.0 nm.

In particular embodiments of the first aspect of the invention, at least about 11% (such as at least about 12%, at least about 13% or at least about 14%) of the pores are as described at point (b).

In more particular embodiments of the first aspect of the invention, at least about 15% (such as at least 16% or at least 17%) of the pores are as described at point (b).

In particular embodiments, a maximum of about 50% (particularly, about 45%) of the pores are as described at point (b).

For example, in certain embodiments, about 10% to about 50% (or, particularly, about 15% to about 50%) of the pores are as described at point (b).

In more particular embodiments of the first aspect of the invention, at least 18% (e.g. about 18% to about 50%) of the pores are as described at point (b).

In yet more particular embodiments of the first aspect of the invention, about 18% to about 38% of the pores are as described at point (b).

For example, in certain embodiments, about 28% of the pores are as described at point (b).

In particular embodiments of the first aspect of the invention, about 20% to about 30% of the pores are as described at point (b).

In other embodiments of the first aspect of the invention, about 15% to about 25% of the pores are as described at point (b).

For example, in certain embodiments, about 20% of the pores are as described at point (b).

In more particular embodiments of the first aspect of the invention, about 20% to about 33% of the pores are as described at point (b).

In yet more particular embodiments of the first aspect of the invention, about 22% to about 31% of the pores are as described at point (b).

As indicated herein, particular embodiments relating to certain features of the silica particle of the first aspect of the invention may be combined with embodiments relating to other features of the silica particle of the first aspect of the invention without departing from the teaching of the present invention.

For example, in a particular embodiments (i.e. particular embodiments of the first aspect of the invention), there is provided the porous silica particle wherein:

(a) at least about 25% (e.g. about 25% to about 70%) of the pores of the silica particle are mesopores of a size in the range of from about 9.0 to about 12.0 nm; and (b) at least about 15% (e.g. about 15% to about 50%) of the pores of the silica particle are lateral pores of a size in the range of from about 0.5 to about 5.0 nm.

In a further embodiment, there is provided the porous silica particle wherein:

(a) at least about 25% of the pores of the silica particle are mesopores of a size in the range of from about 9.0 to about 10.2 nm; and (b) at least about 15% of the pores of the silica particle are lateral pores of a size in the range of from about 0.5 to about 5.0 nm.

In a further embodiment, there is provided the porous silica particle wherein:

(a) at least about 25% of the pores of the silica particle are mesopores of a size in the range of from about 9.0 to about 11.0 nm; and (b) at least about 15% of the pores of the silica particle are lateral pores of a size in the range of from about 0.5 to about 5.0 nm.

In a more particular embodiment, there is provided the porous silica particle wherein:

(a) at least about 25% (e.g. about 25% to about 50%) of the pores of the silica particle are mesopores of a size in the range of from about 9.0 to about 11.0 nm; and (b) at least about 18% (e.g. about 18% to about 50%) of the pores of the silica particle are lateral pores of a size in the range of from about 0.5 to about 5.0 nm.

In a yet more particular embodiment, there is provided the porous silica particle wherein:

(a) at least about 25% (e.g. about 25% to about 50%) of the pores of the silica particle are mesopores of a size in the range of from about 9.0 to about 10.2 nm; and (b) at least about 18% (e.g. about 18% to about 50%) of the pores of the silica particle are lateral pores of a size in the range of from about 0.5 to about 5.0 nm.

For example, in a certain embodiment, there is provided the porous silica particle wherein:

(a) about 50% to about 61% of the pores (or, alternatively, about 66% of the pores) of the silica particle are mesopores of a size in the range of from about 7.0 to about 13.0 nm; and (b) about 22% to about 31% of the pores (or, alternatively, about 20% of the pores) of the silica particle are lateral pores of a size in the range of from about 0.5 to about 5.0 nm.

As described herein, the porous silica particle of the present invention has a hierarchical pore structure. The skilled person will understand that such references to a hierarchical pore structure will refer to the silica particle having pores in more than one size range, such as the pores described at points (a) and (b) in relation to the particle of the first aspect of the invention.

As described herein, the pores referred to at point (a) of the first aspect of the invention are described as mesopores. The skilled person will understand that the term mesopore typically refers to pores with a diameter in a maximum range of from 2.0 to 50.0 nm (according to the IUPAC definition), and particles comprising such pores are typically referred to as mesoporous. Such mesopores may be provided as a two-dimensionally ordered array of cylindrical pores having uniform size arranged parallel to each other and separated by thin walls, which can be designed in a controllable manner. Such mesopores may be structurally ordered, such as by being ordered in a 2-dimensional hexagonal arrangement, which arrangement may be, in particular, a honeycomb, hexagonal cage or cubic cage arrangement (or mesostructure). Such pores may also be considered to be aligned in a manner that is substantially longitudinal.

As described herein, the pores referred to in point (b) of the first aspect of the invention are described as lateral pores. Such lateral pores are typically a mixture of small pores, primarily with a size of equal to and below 5.0 nm. These lateral pores are present within the walls of mesopores and typically stem from mesopore channels (in a substantially perpendicular path to the path thereto), and are typically structurally non-ordered. In particular, some (e.g. a significant number of) lateral pores may form channels connecting adjacent mesopore channels (although typically not all such lateral pores will form connections in this manner). Such pores may be considered to be substantially lateral by reference to substantially longitudinal mesopores described at point (a) in the first aspect of the invention, as referred to herein above. Thus, in certain embodiments, lateral pores described at point (b) of the first aspect of the invention may be defined as structurally non-ordered pores present within the walls of mesopores described at point (a) of the first aspect of the invention. Such lateral pores may, in certain instances, also be described as extending (e.g. extending radially) from (i.e. from the interior of) the channel(s) of mesopores as present in the particles.

For example, a diagrammatic explanation of the arrangement of the pores as described as points (a) and (b) of the first aspect of the invention can be seen in FIG. 2 as provided herein, where (a) is labelled as "D. Spatially ordered, cylindrical mesopores" and (b) is labelled as "C. Narrowly elongated lateral pores".

The skilled person will understand that the availability of number of pores in each particle may affect the surface area of the particle (with the presence of larger number of pores increasing the surface area of the particle). Thus, the preparation of a particle with a greater number of pores may allow for a greater particle surface area.

The skilled person will understand that the surface area of a particle (or a sample of particles) may be calculated using the Brunauer Emmett Teller (BET) theory, a technique well-known to those skilled in the art (see, for example, Brunauer, S., Emmett, P. H., and Teller, E., *J. Am. Chem. Soc.*, 60(2), 309-319 (1938)).

In a particular embodiment, the particle has a BET surface area of at least about 500 $m^2/g$.

In a more particular embodiment, the particle has a BET surface area of from about 500 to about 1500 $m^2/g$.

In a more particular embodiment, the particle has a BET surface area of from about 500 to about 1200 $m^2/g$.

In a yet more particular embodiment, the particle has a BET surface area of from about 600 to about 1200 $m^2/g$.

In an alternative embodiment, the particle has a BET surface area of from about 600 to about 1000 $m^2/g$.

In a further alternative embodiment, the particle has a BET surface area of from about 500 to about 900 $m^2/g$, such as from about 550 to about 900 $m^2/g$.

In a yet further alternative embodiment, the particle has a BET surface area of from about 600 to about 850 $m^2/g$.

In a particular embodiment, the particle has a substantially non-spherical morphology (i.e. an aspect ratio of greater than 1:1, such as greater than 1.1:1).

In a more particular embodiment, the particle has an aspect ratio of greater than 1.5:1, such as greater than 1.8:1.

In a yet more particular embodiment, the particle has an aspect ratio equal to or greater than 2:1.

As used herein, the term "aspect ratio" will be understood to refer to the ratio between the largest cross-section diameter of the silica particle and the smallest cross-section diameter.

Alternatively, such particles (i.e. particles having a substantially non-spherical morphology) may be described as having at least one plane (i.e. an equally dividing plane bisecting the particle) of asymmetry (i.e. such that the morphology of the particle differs about the plane).

In a more particular embodiment, the particle has an essentially rod-shaped morphology.

As used herein, the term essentially rod-shaped will be understood as referring to a particle of an elongate form resembling a rod, in which the rod may be straight or curved (e.g. such rod shaped particles may be substantially straight).

In such instances, where particles are essentially rod-shaped, the skilled person may understand that mesopores as described herein (e.g. the pores described at point (a) in relation to the particles of the invention) may provide channels running substantially parallel to one axis of the rod (e.g. the length of the rod) and that lateral pores as described herein (e.g. the pores described at point (b) in relation to the particles of the invention) may provide channels running substantially perpendicular to, and in particular forming lateral channels between, such mesopores.

The skilled person will understand that the term particle size, as used herein, will refer to the diameter of the particle at the greatest point thereof, which may be measured using techniques well-known to those skilled in the art, for example using electron microscopy techniques (such as by Scanning Electron Microscopy (SEM) or Transmission Electron Microscopy (TEM), or dynamic light scattering (DLS) technique known to those skilled in the art). In a particular embodiment, particle size is determined using electron microscopy (e.g. using SEM).

In a particular embodiment, the particle has a particle size of from about 0.2 to about 10.0 μm.

In a more particular embodiment, the particle has a particle size of from about 0.2 to about 9.0 μm.

In a yet more particular embodiment, the particle has a particle size of from about 0.3 to about 8.0 μm.

In a yet more particular embodiment, the particle has a particle size of from about 0.4 to about 7.0 μm.

In a yet more particular embodiment, the particle has a particle size of from about 0.4 to about 6.0 μm.

In a yet more particular embodiment, the particle has a particle size of from about 0.4 to about 5.0 μm.

In a more particular embodiment, the particle has a particle size of from about 0.5 to about 5.0 μm.

Thus, in particular embodiments, the porous silica particle may be characterized by having an essentially rod-shaped morphology, as seen by electron microscopy (such as by Scanning Electron Microscopy (SEM) or Transmission Electron Microscopy (TEM), using techniques known to those skilled in the art), such as with a rod-length of from about 0.5 to about 5.0 μm.

The skilled person will also understand that, in relation to the pores in a given range, there may also be calculated an average pore size. Such average pore size may be measured by the nitrogen sorption technique and calculated using the Density Functional Theory (DFT), which will be well-known to those skilled in the art (see: Olivier, J. P. and Conklin, W. B., Micromeritics Instrument Corp; presented at the International Symposium on the Effects of Surface Heterogeneity in Adsorption and Catalysts on Solids, Kazimierz Dolny, Poland (July 1992); Landers, J., et al., *Colloids and Surfaces A: Physicochem. Eng. Aspects,* 437, 3-32 (2013)). As such, references herein to average pore size may refer to average pore size as measured by nitrogen sorption and calculated using DFT.

In a particular embodiment, the average pore size of the pores in the range 5.0 to 50.0 nm is from about 7.0 to about 13.0 nm.

In a more particular embodiment, the average pore size of the pores in the range 5.0 to 50.0 nm is from about 8.0 to about 12.0 nm.

In a yet more particular embodiment, the average pore size of the pores in the range 5.0 to 50.0 nm is from about 8.0 to about 11.0 nm.

In a yet more particular embodiment, the average pore size of the pores in the range 5.0 to 50.0 nm is from about 8.8 to about 10.6 nm.

In an alternative embodiment, the average pore size of the pores in the range 5.0 to 50.0 nm is from about 9.0 to about 10.0 nm.

For example, the average pore size of the pores in the range 5.0 to 50.0 nm may be about 9.6 nm.

In a particular embodiment, the surface hydroxyl groups of the silica particle are unmodified, whereby such silica may be referred to as pristine silica.

In a particular embodiment, there is provided the silica particle wherein:

(i) the surface hydroxyl (OH) groups are in an amount of from about 0.5 to about 7.0 per $nm^2$; and/or (e.g. and)

(ii) the surface hydroxyl (OH) groups have two distinct $pK_a$ values being at a first $pK_a$ of from 3.5 to 4.2 and at a second $pK_a$ of from 8.0 to 8.7.

In a particular embodiment, the pores described at point (a) in relation to particles of the invention are structurally ordered, such as being ordered in a 2-dimensional hexagonal arrangement.

The skilled person will understand that, as used herein, references to ordered pores may refer to a porous material wherein the pores are periodically organized at the relevant scale and produce a sharp maxima in a diffraction analysis wherein the maxima at d-values reflect the pore-to-pore distance (see McCusker, L. B., *Reviews in Mineralogy and Geochemistry,* 57(1), 1-16 (2005)).

In certain embodiments, the porous silica particle may be described as being substantially non-crystalline (and materials formed from a plurality of such particles may be described in the same manner). As such, the porous silica particle of the first aspect of the invention may be described as a substantially non-crystalline (or, simply, non-crystalline) porous silica particle.

In alternative embodiments, the silica material present in particles as described in the first aspect of the invention may be described as being amorphous. In such embodiments, it will be understood that the term amorphous will indicate that the structure of the silica material (excluding the pores present therein) has no substantial order, such as the order which may be present in a crystalline substance.

Compositions

The skilled person will understand that the porous silica particle as defined in the first aspect of the invention may be provided as a plurality thereof. As such, the first aspect of the invention may also refer to a porous silica material comprising (or consisting substantially of, e.g. consisting of) the silica particles as defined therein.

In a second aspect of the invention, there is provided a composition comprising a plurality of silica particles (which may alternatively be described as a porous silica material).

In a particular embodiment of the second aspect of the invention, there is provided a composition wherein (i.e. in which) at least 50% of the silica particles are as defined in the first aspect of the invention (i.e. the first aspect of the invention as defined herein, including all embodiments thereof).

In a third aspect of the invention, there is provided a pharmaceutical composition comprising a plurality of silica particles (which may alternatively be described as pharmaceutical composition comprising a porous silica material), and optionally one or more pharmaceutically acceptable excipient(s), colorant(s) and/or flavouring(s).

In a particular embodiment of the third aspect of the invention, there is provided a pharmaceutical composition wherein (i.e. in which) at least 50% of the silica particles are as defined in the first aspect of the invention (i.e. the first aspect of the invention as defined herein, including all embodiments thereof).

For the avoidance of doubt, the skilled person will understand that references herein to particles forming part of a composition may include only particles of a suitable size to be considered as forming part of the composition (i.e. particles that may be able to function as a component of the composition).

In particular embodiments of the second and third aspects of the invention, at least 60% by weight of the silica particles (i.e. the total silica particles present in the composition) are as defined in the first aspect of the invention.

In more particular embodiments of the second and third aspects of the invention, at least 70% by weight of the silica particles are as defined in the first aspect of the invention.

In yet more particular embodiments of the second and third aspects of the invention, at least 80% by weight of the silica particles are as defined in the first aspect of the invention.

In yet more particular embodiments of the second and third aspects of the invention, at least 90% by weight of the silica particles are as defined in the first aspect of the invention.

In yet more particular embodiments of the second and third aspects of the invention, at least 95% by weight of the silica particles are as defined in the first aspect of the invention.

In yet more particular embodiments of the second and third aspects of the invention, at least 99% (such as at least 99.5% or, particularly, at least 99.9%) of the silica particles are as defined in the first aspect of the invention.

For example, in particular embodiments of the second and third aspects of the invention, substantially all of the silica particles present are as defined in the first aspect of the invention.

In particular embodiments of the second and third aspects of the invention, the composition consists essentially of the plurality of silica particles.

As used herein, the term "consists essentially of" may indicate that the relevant composition consists of at least 90% by weight (e.g. at least 95% by weight, such as at least 99% by weight or, particularly, at least 99.9%) of the relevant substance.

In particular embodiments of the second and third aspects of the invention, the composition consists of the plurality of silica particles.

In alternative embodiments of the second and third aspects of the invention, references to the composition consisting essentially of (or consisting of) the silica particles may refer to the porous silica particle content of the composition consisting essentially of (or consisting of) the silica particles as defined herein (i.e. such that components other than porous silica material may be present).

For the avoidance of doubt, the skilled person will understand that references herein to a composition will include references to compositions formed from a plurality of like substances, such as a plurality of like particles.

The skilled person will understand that, as the porous silica particles are therapeutically active, the inclusion of other therapeutic agents in compositions (including pharmaceutical compositions) as described herein is optional.

In particular embodiments of the second and third aspects of the invention, the composition comprises the porous silica material (as defined in the first aspect of the invention) as the only (i.e. sole) therapeutically active ingredient.

Thus, in further embodiments of the second and third aspects of the invention, the composition is substantially free of other therapeutically active ingredients.

As used herein, the term substantially free will refer to the essential material (e.g. the composition referred to) comprising no significant (i.e. clinically significant) amount of the other material referred to (e.g. the other therapeutically active ingredient(s)), which may indicate the presence of less than 10% (e.g. less than 5%, such as less than 2%, less than 1%, less than 0.5% or, particularly, less than 0.1%, less than 0.01% or less than 0.001%) by weight of the other material, or more particularly the presence of no detectable amount of the other material.

In particular embodiments of the second and third aspects of the invention, the composition is a composition for (e.g. formulated for) oral administration (which may be described as an oral composition).

In particular embodiments, the composition is in a suitable oral dosage form; for example, in the form of a tablet, filled capsule, caplet, powder, suspension (e.g. an aqueous suspension), or the like.

As described herein, the pharmaceutical composition of third aspect of the invention may optionally be one or more pharmaceutically acceptable excipient(s), colorant(s) and/or flavouring(s).

As used herein, the term pharmaceutically acceptable excipients includes references to vehicles, adjuvants, carriers, diluents, stabilizers, preservatives, anti-adherents, glidants, and the like. In particular, such excipients may include adjuvants, diluents and/or carriers.

In some embodiments, pharmaceutical excipients (e.g. carriers, diluents and stabilizer), may be selected depending on the route of administration, and those skilled in the art will be able to determine the most suitable formulation for use in each particular case.

Methods for the preparation of pharmaceutical compositions, including those provided in suitable dosage forms, are well-known in the art; for example, as set out in textbooks such as Remington's Pharmaceutical Sciences, 21st Edition, Williams & Wilkins, Pennsylvania, USA (2006).

Medical and Non-Medical Uses

As described herein, development of metabolic disorders, such as type 2 diabetes and obesity, are typically preceded by an increase in certain risk factors that may cause either metabolic or cardiovascular events. Reduction of such risk factors may lead to prevention or delayed onset of the actual disease. Particles as described in the present invention may be particularly suited for use in the reduction of such risk factors, and in the treatment of resulting conditions (such as obesity, prediabetes, type 2 diabetes and dyslipidaemia).

Moreover, treatment with particles as described in the present invention may provide an effective means for the treatment of obesity and reduction of body fat (i.e. body fat in the form of adipose tissue), and therefore may also be suitable for use in the treatment of related conditions.

In a fourth aspect of the invention, there is provided a porous silica particle as defined in the first aspect of the invention, or a composition defined in the second aspect of the invention, for use as a pharmaceutical (or for use in medicine).

In an alternative fourth aspect of the invention, there is provided the use of a porous silica particle as defined in the first aspect of the invention, or a composition defined in the second aspect of the invention, as a medical device.

The term medical device will be well-known in the field of medicine and may be interpreted accordingly. In particular, the skilled person will understand that the term medical device may refer to a material used or intended to be used, alone or in combination, for therapeutic purposes.

For the avoidance of doubt, the skilled person will understand that, following oral administration, the particle of the first aspect of the invention will typically function in a manner that does not involve absorption across the intestinal wall.

Thus, in particular embodiments of all uses of the particle of the first aspect of the invention as described herein (including formulations thereof; e.g. those uses described in the fourth to sixth aspects of the invention), the particle (in use) is substantially retained in the gastrointestinal (GI) tract of the patient (or subject). The skilled person will be able to determine whether the silica particle (or particles as present in formulations as described herein) are retained in the GI tract in use (i.e. in treatment or other relevant uses) using techniques that are routine in the art.

In particular embodiments, when administered orally, it may additionally (or alternatively) be stated that, in use, the particle is not systemically absorbed. Thus, where a plurality of such particles are administered orally it may be stated that, in use, substantially no systemic absorption of the particles occurs (or is observed and/or measured).

In a fifth aspect of the invention, there is provided a method for the treatment or prophylaxis of a metabolic disease or disorder, comprising administering to a patient in need thereof a therapeutically effective amount of a silica particle as defined in the first aspect of the invention, a composition as defined in the second aspect of the invention, or a pharmaceutical composition as defined in the third aspect of the invention.

In a sixth aspect of the invention, there is provided a particle as defined in the first aspect of the invention, a composition as defined in the second aspect of the invention or a pharmaceutical composition as defined in the third aspect of the invention for use in the treatment or prophylaxis of a metabolic disease or disorder.

In an alternative sixth aspect of the invention, there is provided the use of a particle as defined in the sixth aspect of the invention or a composition as defined in the second aspect of the invention in the manufacture of a medicament for use in the treatment or prophylaxis of a metabolic disease or disorder.

As used herein, the skilled person will understand that references to a metabolic disease or disorder will refer to diseases or disorders that disrupt normal metabolism, i.e. the process of converting food to energy. As such, such diseases and disorders will include those expected to benefit from adjustment of dietary intake, such as by modulation of the uptake of dietary components (e.g. carbohydrates such as sugars, proteins and lipids).

The skilled person will also understand that metabolic diseases and disorders may in turn give rise to cardiovascular diseases and disorders, which may also be treated (or prophylaxis thereof may occur) as part of the present invention.

In particular embodiments of the fifth and sixth aspects of the invention, the treatment or prophylaxis of a metabolic disease or disorder will refer to:

(a) the reduction of metabolic and/or cardiovascular (e.g. metabolic) risk-factors of type 2 diabetes;
(b) the treatment or prophylaxis of type 2 diabetes;
(c) the treatment or prophylaxis of prediabetes;
(d) the treatment or prophylaxis of metabolic syndrome;
(e) the treatment or prophylaxis of obesity;
(f) the lowering of, or prevention of increase in, body fat levels in the form of adipose tissue;
(g) the lowering of, or prevention of increase in, triglyceride and/or cholesterol levels; and
(h) the treatment or prophylaxis of dyslipidaemia.

For the avoidance of doubt, the skilled person will understand that references in the fifth and sixth aspects of the invention to the lowering of, or prevention of increase in, the levels of certain substances (i.e. the levels of certain substances in the body of the patient) may refer to such lowering in a therapeutic manner, or to the prevention of increase in a prophylactic manner, and as such may be performed in a patient in need thereof.

Alternatively, references in the fifth and sixth aspects of the invention to the lowering of, or prevention of increase in, the levels of certain substances (i.e. the levels of certain substances in the body of the patient) may refer to such lowering, or to the prevention of increase, in a non-therapeutic (e.g. cosmetic) manner.

Thus, in a further alternative fifth and sixth aspects of the invention, there is provided the use of a particle as defined in the sixth aspect of the invention or a composition as defined in the second aspect of the invention in:

the non-therapeutic lowering of, or prevention of increase in, body fat levels in the form of adipose tissue; and the non-therapeutic lowering of, or prevention of increase in, triglyceride and/or cholesterol levels.

The skilled person will understand that references to the treatment of a particular condition (or, similarly, to treating that condition) will take their normal meanings in the field of medicine. In particular, the terms may refer to achieving a reduction in the severity and/or frequency of occurrence of one or more clinical symptoms associated with the condition, as adjudged by a physician attending a patient having or being susceptible to such symptoms. For example, in the case of the treatment of type 2 diabetes, the term may refer to achieving a reduction in blood glucose levels experienced by a patient (e.g. postprandial glucose levels, i.e. those experienced following the consumption of food).

As used herein, the term prophylaxis will include references to the prevention of (and, similarly, preventing) the disease or disorder (and vice-versa). As such, references to prevention may also be references to prophylaxis, and vice versa. In particular, such terms may refer to achieving a reduction (for example, at least a 10% reduction, such as at least a 20%, 30% or 40% reduction, e.g. at least a 50% reduction) in the likelihood of the patient (or healthy subject) developing the condition (which may be understood as meaning that the condition of the patient changes such that the patient is diagnosed by a physician as having, e.g. requiring treatment for, the relevant disease or disorder) or experiencing the relevant effect.

Similarly, references to achieving a reduction in risk factors may refer to achieving a clinically significant reduction in the level of at least one of the biomarkers for such risk factors. For example, in certain circumstances, such a reduction may be a reduction of at least 1% (e.g. at least a 2%, 3%, 4%, 5%, 6%, 7%, 8%, 9%, 10%, 15%, 20%, 30%, or 40%, reduction, such as at least a 50% reduction) of the level by which such risk factors exceed their normal values (i.e. the range of values expected in such a patient in a healthy condition) as known to those skilled in the art.

As used herein, references to a patient (or to patients) will refer to a living subject being treated, including mammalian (e.g. human) patients. In particular embodiments, references to a patient will refer to human patients.

In alternative embodiments, references to a patient may refer to other mammals, such as livestock (e.g. cattle, pigs, sheep, goats, horses, and the like) and/or household pets (e.g. cats, dogs, rabbits, and the like).

Thus, in certain alternative embodiments, the pharmaceutical composition of the third aspect of the invention may instead be referred to as a veterinary composition.

For the avoidance of doubt, the skilled person will understand that such treatment or prophylaxis will be performed in a patient (or subject) in need thereof. The need of a patient (or subject) for such treatment or prophylaxis may be assessed by those skilled in the art.

As used herein, the terms disease and disorder (and, similarly, the terms condition, illness, medical problem, and the like) may be used interchangeably.

As used herein, the term effective amount will refer to an amount of a compound that confers a therapeutic effect on the treated patient. The effect may be observed in a manner that is objective (i.e. measurable by some test or marker) or subjective (i.e. the subject gives an indication of and/or feels an effect). In particular, the effect may be observed (e.g. measured) in a manner that is objective, using appropriate tests as known to those skilled in the art.

For the avoidance of doubt, the skilled person (e.g. the physician) will be able to determine the actual dosage which will be most suitable for an individual patient, which is likely to vary with the route of administration, the type and severity of the condition that is to be treated, as well as the species, age, weight, sex, renal function, hepatic function and response of the particular patient to be treated.

For example, particularly when administered orally to a human patient, the silica material as described in the first aspect of the invention (e.g. in the form of compositions comprising the same, such as those described in the second and third aspects of the invention) may be administered in doses of from about 0.1 to about 20.0 g (e.g. about 0.5 to about 15.0 g, such as from about 3.0 to about 9.0 g), which doses may be administered on one or more occasions daily (i.e. during a 24 hour period).

In particular, the skilled person will understand that doses of the silica material may be administered at suitable intervals, such as intervals corresponding to the consumption of food by the patient (e.g. a meal). As such, the doses referred to herein may be understood to be doses that are timed to be administered with food (i.e. timed to coincide with the times at which the patient consumes food, such as a meal).

As used herein, references to diseases and disorders will be understood by those skilled in the art, such as by references to definitions provided in the international classification of such disorders (see, for example, the International Classification of Diseases (ICD), as provided by the World Health Organisation (WHO), such as that updated as of 1 Jan. 2017).

For example, the disorder referred to as metabolic syndrome, which is sometimes known by other names, may refer to a clustering of at least three of the five following medical conditions: abdominal obesity, high blood pressure, high blood sugar (glucose), high serum triglycerides and low high-density lipoprotein (HDL) levels (as defined by, for example, The National Cholesterol Education Program (NCEP) Adult Treatment Panel III (ATP III)).

As described herein, the silica particles of the present invention, and compositions comprising the same, are able to deliver a therapeutic effect per se. Treatment with such particles and compositions may therefore be therapeutically effective even in the absence of treatment with any other therapeutic agent(s).

In particular embodiments of the fifth and sixth aspects of the invention, the method or use does not comprise administration in combination with other therapeutic agents used in the same such method or use (i.e. the silica particles of the first aspect of the invention, or compositions of the second and third aspects of the invention, may be used/administered as a mono-therapy).

In more particular embodiments of the fifth and sixth aspects of the invention, the method or use does not comprise administration in combination with other therapeutic agents.

In a further embodiment of the fifth aspect of the invention, the method comprises administration of the silica particle as defined in the first aspect of the invention, the composition as defined in the second aspect of the invention, or the pharmaceutical composition as defined in the third aspect of the invention, as a mono-therapy.

In a further embodiment of the sixth aspect of the invention, the use comprises administration of the pharmaceutical composition as defined in the third aspect of the invention as a mono-therapy.

As described herein, the present invention relates to the use of the porous silica particles, or compositions comprising the same, as described herein, as an active therapeutic ingredient, such as in a method for the reduction of metabolic risk-factors of type 2 diabetes. The present invention also relates to a method for, or compound for use in, the treatment of prediabetes, which may refer to prophylaxis of prediabetes progressing to a clinical state diagnosed as type 2 diabetes.

For the avoidance of doubt, metabolic risk-factors of type 2 diabetes and methods for measuring the same will be well-known to those skilled in the art. Non-limiting examples of biomarkers for such risk-factors may include: the identification of disturbed (i.e. shifted) levels of low density lipoprotein (LDL), high density lipoprotein (HDL), triglycerides, cholesterol, Apo A1 and/or Apo B; and/or a disturbed ratio between Apo A1 and Apo B, and/or between LDL and HDL (wherein references to "disturbed" levels may refer to a value that is shifted from the normal value for the patient in question by a clinically significant amount, as determined by those skilled in the art); and/or high blood pressure, raised insulin resistance, high glucose levels, raised HbA1c, and any combinations thereof (wherein references to "raised" or "high" levels may refer to a value that is higher than the normal value for the patient in question by a clinically significant amount, as determined by those skilled in the art).

In particular embodiments of the fifth and sixth aspects of the invention, the metabolic risk-factors of type 2 diabetes are based on analysis of levels of one or more biomarker selected from the group consisting of: LDL, HDL, triglycerides, cholesterol, Apo A1 and Apo B; the ratio between Apo A1 and Apo B, and between LDL and HDL cholesterol; and blood pressure, insulin resistance and glucose levels, and levels of HbA1c.

In particular embodiments, the metabolic risk-factors of type 2 diabetes may be the identification of elevated levels of HbA1c. Similarly, a patient may be identified as having prediabetes based on the identification of elevated levels of HbA1c in a patient not diagnosed as having diabetes (e.g. type 2 diabetes).

For the avoidance of doubt, those skilled in the art will understand that references to elevated levels of HbA1c will refer to levels above those in the range expected to be observed in such a patient (i.e. a patient of the same type) but in a healthy condition.

For example, according to the American Diabetes Association, HbA1c levels may be identified as being elevated when at or greater than 39.0 mmol/mol (equal to 5.7% DCCT). In particular, a patient may be identified as suffering from prediabetes when having HbA1c levels in the range of from 39.0 mmol/mol to 46.0 mmol/mol (5.7% to 6.4% DCCT; although patients with HbA1c levels greater than 46.0 mmol/mol may be diagnosed as having prediabetes if such patients do not meet the criteria for clinical diagnosis of diabetes, which typically requires HbA1c levels greater than or equal to 47.0 mmol/mol).

The skilled person will also be aware that prediabetes may be diagnosed based on other indicating factors as known to those skilled in the art, such as based on measurement of fasting blood glucose levels (e.g. by identifying a fasting blood glucose of 100-125 mg/dl) or through use of an oral glucose tolerance test (OGTT) (e.g. based on a patient having results from OGTT 2 hour blood glucose of 140 mg/dl-199 mg/dl).

The skilled person will understand that the condition dyslipidaemia may be understood to be a high level of lipids (cholesterol, triglycerides, or both) carried by lipoproteins in the blood. This term may include hypolipoproteinemia (hyperlipidaemia), which refers to abnormally high levels of total cholesterol, low density lipoprotein (LDL) or triglycerides, as well as an abnormally low level of high density lipoprotein (HDL). Thus, for the avoidance of doubt, dyslipidaemia includes hyperlipidaemia.

As described herein, the silica particles of the present invention, and compositions comprising the same, may act to reduce metabolic risk factors of diabetes in a manner that is independent of the treatment of underlying causative factors, such as obesity.

Thus, in particular embodiments of the fifth and sixth aspects of the invention, the method for or use in:

(a) the reduction of metabolic and/or cardiovascular (e.g. metabolic) risk-factors of type 2 diabetes, (b) the treatment or prophylaxis of type 2 diabetes, (c) the treatment of prediabetes, and (d) the treatment or prophylaxis of metabolic syndrome, is in a non-obese patient (i.e. a patient with a BMI of less than 30), particularly in a non-overweight patient (i.e. a patient with a BMI of less than 25), such as in a patient of healthy body weight (e.g. a patient with a BMI of from 18.5 to 24.9).

As described herein, the silica particles of the present invention, and compositions comprising the same, may be useful in medical treatments performed without use of other therapeutic agents (i.e. as a mono-therapy).

In further embodiments of the fifth and sixth aspects of the invention, the method for or use in:

the treatment or prophylaxis of type 2 diabetes;

the treatment of prediabetes;

the treatment or prophylaxis of metabolic syndrome;

the treatment of dyslipidaemia.

is in a patient that is not being administered (i.e. is not taking) another therapeutic agent for the treatment or prophylaxis of such conditions.

In particular embodiments of the fifth and sixth aspects of the invention, the reference to cholesterol levels may include references to Apo A1, Apo B and/or non-HDL cholesterol, and/or to LDL cholesterol, and to the LDL/HDL cholesterol ratio.

As described herein, the silica material of the present invention may act as a molecular sieve by physically separating smaller molecules from larger molecules through its tailored porosity. This physico-chemical separation leads to a delay and reduction in the digestion of food and uptake of biomolecules into the body, thereby reducing energy uptake, thus lowering and delaying postprandial blood lipid and sugar peaks in animal model systems as well as lowering biomarkers such as HbA1c and blood levels of LDL cholesterol in human subjects.

As used herein, references to lowering of risk factors by reference to particular biological markers may refer to lowering of those risk factors from a raised level to a level closer to (or even within) the range expected in such a patient in a healthy state. For example, in relation to the lowering of HbA1c levels, such a lowering may refer to a lowering of at least 0.1 mmol/mol, such as a lowering of from about 0.1 mmol/mol to about 20.0 mmol/mol. The skilled person will understand that such a lowering may occur following treatment over an extended period of time.

In particular, the porous silica material of the first aspect of the invention, and compositions of the second and third aspects of the invention, may be used as a pharmaceutical treatment or as an active dietary supplement to increase metabolic health by lowering food efficiency, which may be used in a population of subjects (or patients) at risk of developing prediabetes, or who are already diagnosed with metabolic disease such as, but not limited to, type 2 diabetes, obesity, weight related diseases, abnormal glycaemic homeostasis, and metabolic syndrome.

In one embodiment, ingestion of the particles may affect the total carbohydrate absorption from the digestive system. The term carbohydrate absorption denotes the process occurring in the digestive system involving the break-down of food components, containing complex carbohydrates i.e. sugar polymers longer than a dimer, so that they can be taken up or absorbed by the organism.

In another embodiment, the particles may, upon ingestion, affect the levels of HbA1c. The term "HbA1c" denotes glycated haemoglobin and is a laboratory measure of glycaemic control during the preceding 2 to 3 months (Bennett, C. M. et al., *Diabet. Med.,* 24(4), 333-43 (2007)). As the skilled person will know, this biological marker is well-established and used for type 2 diabetes diagnosis and assessment of the risk of complications (Lind, M. et al., *Diabetes & Metabolic Syndrome: Clinical Research and Reviews,* 2(4), 282-293 (2008)).

Thus, in particular embodiments, the treatment of prediabetes, or the treatment or prevention of diabetes and/or metabolic syndrome, as described herein, may be characterised by (i.e. identified by) the lowering of, or prevention of the increase of, the levels of HbA1c in the patient. Moreover, the methods of treatment of such conditions may be referred to as methods of lowering HbA1c levels in a patient in need thereof.

In yet another embodiment, the particles can lower the postprandial carbohydrate uptake into the blood. As used herein, the term postprandial may refer to the levels observed immediately after a meal has been consumed, as measured over time.

Without wishing to be bound by theory, it is thought that the porous silica particles, and compositions comprising the same, according to the present invention can displace the absorption of carbohydrates further down the digestive system.

In one embodiment, the particles can upon ingestion simultaneously affect the carbohydrate and lipid absorption from the digestive system. In another embodiment, the particles can upon ingestion affect the levels of blood lipids.

In yet another embodiment, the particles can upon ingestion affect the total postprandial absorption of both carbohydrates and lipids uptake into the blood.

In particular embodiments of the fifth and sixth aspects of the invention, the use or methods requires that the silica material or composition is administered with food (i.e. with a meal, such as with each meal consumed by the patient).

The skilled person will understand that references herein to administration with food (or, similarly, to administration with a meal) may refer to administration at the same time as food is consumed (e.g. as part of, such as by being mixed with or administered at the same time as consumption of, such food) or shortly before or after the consumption of food (e.g. up to 2 hours, such as up to 1 hour or, particularly, up to 30 minutes, before or after the consumption of food).

As also described herein, the ingestion of the particles of the present invention together with food may lower food efficiency, meaning that less energy is taken up from a given amount of nutrients.

Thus, in a seventh aspect of the invention, there is provided a method of lowering the efficiency of a food or drink item, comprising administering with said food or drink item a silica particle as defined in the first aspect of the invention (including all embodiments thereof).

In an alternative seventh aspect of the invention, there is provided the use of a silica particle as defined in the first aspect of the invention, a composition as defined in the second aspect of the invention, or a pharmaceutical composition as defined in the third aspect of the invention in a method of lowering the efficiency of a food or drink item, with said use comprising administering the silica particle or composition with said food or drink item.

The skilled person will understand that references in the seventh aspect of the invention to administration with a food or drink item may be interpreted in a similar manner to references to administration with food (or with a meal) in the fifth and sixth aspects of the invention.

In a particular embodiment of the seventh aspect of the invention, the food or drink item is a food item, such as a meal.

In a particular embodiment of the seventh aspect of the invention, the lowering of the efficiency of a food or drink item comprises the lowering of the glycaemic response resulting from consumption of the food or drink item.

The skilled person will understand that references to the glycaemic response of a food or drink item will take their normal meanings in the art, such as by referring to the plasma glucose levels experienced by a patient immediately following (and therefore attributable to) consumption of the food or drink item, which may be referred to as the post-prandial blood glucose response (change in concentration) elicited when a food or meal that contains carbohydrate is ingested. As such, references to lowering the glycaemic response may refer to the patient experiencing a lower glucose level following consumption of the food or drink item when such consumption occurs with administration of the silica particle or composition than would have been experienced if such consumption had occurred without administration of the silica particle or composition.

Similarly, in a particular embodiment of the seventh aspect of the invention, the lowering of the efficiency of a food or drink item comprises the lowering of plasma triglyceride levels following consumption of the food or drink item.

In such instances, references to lowering of plasma glucose or triglyceride levels may refer to a lowering of at least 1% (such as at least 2%, 3%, 5%, 7%, 10%, 15% or, particularly, at least 20%).

The skilled person will understand that blood plasma levels of particular substances (such as blood glucose levels) may be measured in a patient using techniques well-known to those skilled in the art, such as by routine analysis of a sample of blood taken from the patient at an appropriate time.

Without wishing to be bound by theory, it is thought that the porous silica particles with numerous well-defined pores of confined internal volume, and compositions comprising the same, according to the present invention may function through their ability to act as a molecular sieve and their ability to deliver that function in vivo, such as in the digestive system. This effect is believed to arise through action of the pores present in particles of a certain size. Upon ingestion, the porous silica particles mix with food within the digestive system. In the digestive system, larger food molecules are broken down by digestive enzymes into biomolecules small enough for the body to absorb. The digestive system therefore contains both large and small biomolecules.

It is believed that the silica material of the present invention acts a molecular sieve through its tailored porosity, whereby smaller biomolecules are physically separated from larger biomolecules. Only small molecules will diffuse into the pores of the silica material (i.e. small molecules are molecules that may diffuse into the pores of the silica material whereas large molecules are molecules that may not diffuse into the pores but may interact with the surface of the silica material). This physically separates a fraction of smaller biomolecules such as digestive enzymes and metabolic products, including dietary lipid complexes, carbohydrate and proteins, from undigested food in the digestive system. The main digestive enzymes responsible for breaking down proteins, sugars and fats are proteases, amylases and lipases, respectively. In acting as a molecular sieve, it is believed that these digestive enzymes, among other biomolecules, may enter the pores of the silica through the facilitated diffusion effect arising from the combination of pore sizes as claimed. This physically separates the entrapped enzymes from the undigested food, leading to slower digestion and uptake of nutrients from the digestive system.

Thus, in a particular embodiment of the invention, the porous silica particles of the first aspect of the invention are designed such that the pore organization is tailored for physically separating a fraction of smaller biomolecules such as digestive enzymes and metabolic products, including lipid complexes, carbohydrate and proteins, from undigested food in the digestive system.

In an eighth aspect of the invention, there is provided a method for separation of a fraction of (typically small) biomolecules, such as enzymes and metabolic products, including lipid complexes, carbohydrate and proteins, from undigested food in the digestive system, comprising administering a silica particle as defined in the first aspect of the invention, a composition as defined in the second aspect of the invention, or a pharmaceutical composition as defined in the third aspect of the invention.

In an alternative eighth aspect of the invention, there is provided the use of a silica particle as defined in the first aspect of the invention, a composition as defined in the second aspect of the invention or a pharmaceutical composition as defined in the third aspect of the invention in a method for separation of a fraction of (typically small) biomolecules, such as enzymes and metabolic products, including lipid complexes, carbohydrate and proteins, from undigested food in the digestive system.

In a particular embodiment of the eighth aspect of the invention, the biomolecules are present in the digestive system.

In a particular embodiment of the eighth aspect of the invention, the biomolecules are digestive enzymes responsible for the breakdown (and thus the absorption) of lipids and carbohydrates.

In a more particular embodiment of the eighth aspect of the invention, the digestive enzymes are digestive enzymes responsible for the breakdown (and thus the absorption) of carbohydrates.

In a particular embodiment of the eighth aspect of the invention, the silica particle or composition is administered with food (as described in the fifth and sixth aspects of the invention), such as being administered immediately prior to the consumption of food, or being administered together with (i.e. as part of) such food.

As described herein, the silica particles of the present invention, or compositions comprising the same, may be taken (i.e. administered) at the same time as, or as part of, food (e.g. a meal).

In a ninth aspect of the invention, there is provided the use of a silica particle as defined in the first aspect of the invention or a composition as defined in the second aspect of the invention as a dietary active ingredient (e.g. as a dietary supplement).

The skilled person will understand that such use as a dietary supplement may comprise inclusion of a silica particle as defined in the first aspect of the invention or a composition as defined in the second aspect of the invention in a food or drink item, such as in an edible food bar or in a shake-type beverage. Such food and drink items also form part of the present invention.

Processes

The present invention also provides a method of preparing a porous silica particle according to the present invention, and compositions comprising the same. Such processes may comprise a stepwise growth of the particles by mixing an organic template and a silica source, with a curing (solidifying) step and a washing step, and an optional calcining step.

In a tenth aspect of the invention, there is provided a process for the preparation of porous silica particles as defined in the first aspect of the invention (or a composition as described in the second or third aspects of the invention), with said process comprising the steps of:

(i) forming a homogenous mixture of
    (a) an organic pore-forming material, and
    (b) a source of silica,
  in an aqueous solution at non-neutral pH, optionally at elevated temperature (such as at a temperature of from about 20° C. to about 60° C.); then
(ii) curing the mixture formed in step (i) by maintaining at increased temperature (such as a temperature of from about 70° C. to about 150° C.) for at least 3 hours; then
(iii) removing the solid material from the cured mixture formed in step (ii) and washing the solid material to neutral pH; then optionally
(iv) removing organic material.

As used herein, the term "organic pore-forming material" (which may also be referred to as a "porogen") will refer to an organic compound, such as a polymer or a surfactant, acting as a template (i.e. a structure for the building thereon) for the silica material.

In a particular embodiment of the tenth aspect of the invention, the organic pore-forming material is a diblock or triblock copolymer or a Pluronic (such as P123, which is a trade name of a Pluronic available from BASF).

As used herein, the term block-copolymers will refer to a templating agent with or without charged head groups or dual charged groups, being a polymer with two or more monomeric chains.

In a further embodiment, the source of silica (i.e. the silica source) is selected from the group consisting of tetraethyl orthosilica (TEOS), tetramethyl orthosilicate (TMOS), tetrapropyl orthosilicate (TPOS) and sodium silicate, or a combination of two or more thereof.

The skilled person will understand that the mixing of the components in step (i) of the process will result in the formation of a mixture between the organic pore-forming material and the source of silica, which may be referred to as a "hybrid composition".

In another embodiment, step (i) of the process of the tenth aspect of the invention comprises stirring the mixture (such as by using a means for mechanical stirring).

In a further embodiment, step (ii) of the process of the tenth aspect of the invention comprises a period wherein the mixture is not stirred (e.g. for the period indicated in relation to step (ii)), such as wherein the mixture undergoes no mixing and/or agitation.

In a particular embodiment, the aqueous solution at non-neutral pH (i.e. the aqueous solution formed in step (i) of the process of the ninth aspect of the invention) comprises an acid, a base or a suitable buffer.

In a more particular embodiment, the aqueous solution at non-neutral pH comprises an acid, such as hydrochloric acid (HCl), which may be present as an aqueous solution thereof.

In a particular embodiment, the aqueous solution at non-neutral pH is at a pH of less than 3 (such as less than 2, e.g. less than 1, including less than 0).

In a particular embodiment, step (i) is performed at a temperature of about 30 to about 50° C.

In a more particular embodiment, step (i) is performed at a temperature of 40±5° C.

In a further embodiment, step (ii) is performed at a temperature of about 90 to about 110° C.

In a yet further embodiment, step (ii) is performed at a temperature of about 98° C.

In step (iv) of the process, the step of removing organic material, will refer in particular to removing residual organic material resulting from the organic pore-forming material used. Such removal of organic material may refer to removing substantially all of such organic material, such as removing at least 90% (e.g. at least 95%, at least 99% or at least 99.9% of such organic material), which may result in the silica material obtained comprising less than 10% (e.g. less than 5%, less than 1% or less than 0.1%) organic material.

In particular embodiments, step (iv) may be performed by: calcining the solid material obtained from step (iii), such as by heating the material to a temperature of at least 300° C. for at least 3 hours; and/or (e.g. or) performing a solvent extraction for removing the organic component of the solid material.

For example, organic material may be removed by calcining the silica material (as obtained from step (iii) of the process as described herein), such as by drying the material (e.g. at about 50° C. for 24-48 hours with or without vacuum) and then subjecting the material to calcination (e.g. at about 550° C. in air).

Particular conditions suitable for each step of the process of the tenth aspect of the invention include those used in the examples provided herein.

The porous silica particles obtained from the process of the tenth aspect of the invention may be provided in the form of discrete particles or as particles in the form of large aggregates and/or agglomerates.

As used herein, the term aggregates will refer to an assemblage of particles that is rigidly bound with particles that are firmly attached at their faces by fusion, sintering or growth; it may also refer to particles that are not readily dispersed (see ISO 14887:2000 (E); Sample Preparation—Dispersing procedures for powders in liquids, as available in the UK from British Standards Institution, 389 Chiswick High Road, London, W4 4AL, UK).

As used herein, the term agglomerates may refer to an assemblage of particles that is loosely bound with particles that are loosely attached by contact at their corners and edges, and may also include references to such particles that are readily dispersed (see ISO 14887:2000 (E): Sample Preparation—Dispersing procedures for powders in liquids, as available in the UK from British Standards Institution, 389 Chiswick High Road, London, W4 4AL, UK).

In an eleventh aspect of the invention, there is provided porous silica particles obtained or obtainable by the process as defined in the tenth aspect of the invention.

Without wishing to be bound by theory, it is thought that the combinative functional advantage delivered by a silica particle having a hierarchical pore structure provides improved function of the silica particles as a molecular sieve, by physically separating smaller molecules from larger ones. Only small molecules, and not larger molecules, will diffuse into the mesopores of the particle. This physically separates a fraction of smaller biomolecules such as digestive enzymes and metabolic products, including lipid complexes, carbohydrate and proteins, from undigested food in the digestive system. This physico-chemical separation leads to a delay and reduction in the digestion of food and uptake of biomolecules into the body, thereby reducing energy uptake. This results in improved lipid profile, glycaemic control and reduced fat accumulation in the body, which in turn allows for use in the treatment and prophylaxis of metabolic diseases and disorders.

Without wishing to be bound by theory, it is additionally thought that the presence of a bimodal pore architecture provides a combinative functional advantage which improves the function of the silica particles in the absorption/uptake of biomolecules, such as digestive enzymes, in vivo. The provision of a silica particle having a particular organization of the claimed well-defined pore structure, composed of a collection of spatially ordered, cylindrical mesopores interconnected via narrowly elongated lateral pores, enables an efficient diffusion of fluids and uptake of biomolecules.

SUMMARY OF THE FIGURES

FIGS. 1A to 1F illustrate examples of the morphology and the physiochemical properties of the material prepared in Example 1, wherein:

FIG. 1A shows the $N_2$ sorption isotherm of the calcined Silica material;

FIG. 1B shows pore size distribution measured via density functional theory (DFT);

FIG. 1C shows low-angle X-Ray diffraction (XRD) pattern showing fingerprints typically associated with 2-dimensional hexagonal pores structure. Peaks 110 and 200 are raised by a factor of 7 for clarity purposes;

FIG. 1D shows images of aggregates of rod-shaped silica material taken with scanning electron microscope (SEM);

FIG. 1E illustrates a model particle as described herein;

FIG. 1F shows a Bright Field image taken with transmission electron microscope (TEM), showing pores skeleton of silica particles in different orientations.

FIGS. 6A and 6B illustrate the effect seen in a clinical trial performed, in which:

FIG. 6A provides a bar graph showing individual changes in HbA1c levels after treatment, wherein it can be seen that the silica of Example 1 delivered a significant reduction in HbA1c of almost 5% in average from baseline;

FIG. 6B provides a bar graph showing the individual changes in lipid levels (specifically, LDL) after treatment. A significant reduction in blood lipid levels was observed.

EXAMPLES

The present invention will be further described by reference to the following examples, which are not intended to limit the scope of the invention.

Example 1: Synthesis and Characterization of Porous Material

Manufacturing Process

All the chemicals used in the synthesis were purchased from Sigma Aldrich. The invention was manufactured in a stepwise manner as described below.

Step 1: 54 g of a poly(ethylene glycol)-poly(propylene glycol)-poly(ethylene glycol) triblock copolymer with an average Molecular Weight≈5800, $EO_{20}PO_{70}EO_{20}$, (commonly referred to as Pluronic P123) paste was dissolved in total of 1793 mL doubly distilled water. Dissolution was performed by stirring at 40° C. under mechanical stirring. Complete dissolution generates an opaque polymer solution. This dissolution was preformed either in a closed or open autoclavable system.

Step 2: An acid, acting as a catalyst, herein HCl (37%) 270 mL, was charged in the polymer solution to lower the pH (<0). Resulting mixture was then charged into a glass reactor anchored with a mechanical stirrer and temperature control unit. Temperature was controlled at 40±5° C.

Step 3: After reaching this temperature, a solution (108 mL) of silica source, TEOS (tetraethyl orthosilicate), was charged rapidly under 1-2 minutes. Resulting mixture was kept under stirring and same temperature for an additional 9±5 min.

Step 4: Stirring was stopped and gel was aged at the same temperature for an additional 20±4 hours. Gel was further cured without stirring at 98±2° C. measuring gel temperature for the course of 10±2 hours having set temperature of the control unit at 105±5° C. The gel was cooled to a temperature lower than 70° C. after 10-20 min vigorous stirring at 500±100 rpm, and transferred to a vacuum connected filtration system and drying system.

Step 5: Initial washing was performed using doubly distilled water until a pH of 5 or above was achieved. Further washing was performed with ethanol or acetone or combination of both ending with acetone.

Step 6: Finally, material dried at 50° C. for 24-48 hours with or without vacuum was subjected to calcination (at 550° C. in air) to remove the polymeric part from the hybrid material resulting in the formation of a porous silica network.

For the avoidance of doubt, silica material referred to herein may be identified by batch number. Using the above-mentioned method, several batches of silica were obtained, including batch SM0023.

A silica comparator was made according to modified protocols from the literature, which was characterized with the same techniques and methods. It is named herein as SM0002 (see Kim, S., Pauly, T. R. Pinnavaia, T. J., *Chemical Communications,* 1661-1662 (2000)) having pore size of 3.3 nm. The properties of this batch were analysed as described below.

Nitrogen Sorption Analysis

Figure 1A:
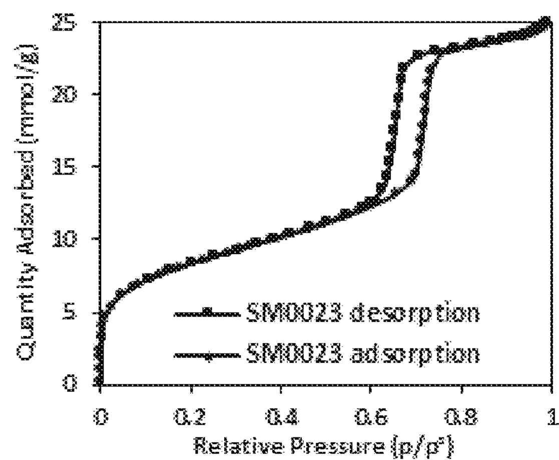
Figure 1B:
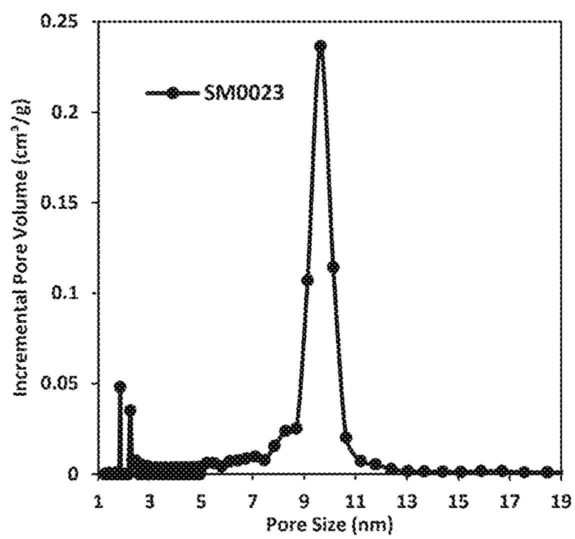

Brunauer-Emmett-Teller (BET) surface area, total pore volume and pore size were calculated from optimized synthesis. BET surface area was calculated from sorption isotherm at a relative pressure)(p/p°) of <0.2 (plots in figure BET surface area; FIG. 1A). Total pore volume for all the three studied silica candidates were recorded at a relative pressure)(p/p°)=0.99. Pore size was derived using the density functional theory (DFT) method assuming a cylindrical pore model. The pore size distribution data for the silica particles is presented in FIG. 1B. The nitrogen sorption isotherm of all the studied silica particles were in accordance with porous silica materials and can be classified as type IV according to the International Union of Pure and Applied Chemistry (IUPAC) nomenclature (Sing, K. S. W., *Pure Appl. Chem.* 57, 603-619 (1985)) (see FIG. 1A). The analysis was performed at liquid nitrogen temperature (−196° C.) using a TriStar II volumetric adsorption analyser (Micromeritics Instrument Corp., GA, USA).

Pore Structure

Figure 1C:
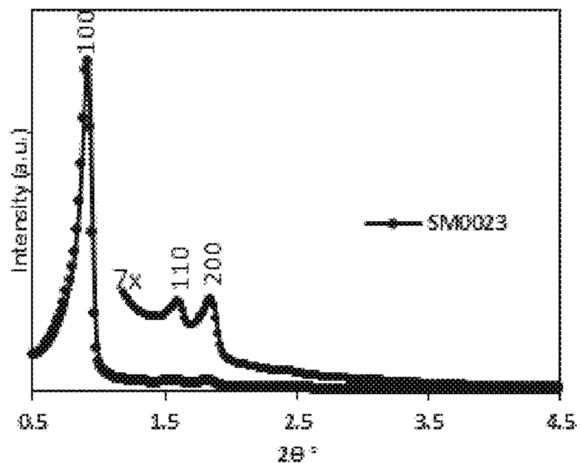

The low angle XRD pattern in FIG. 1C shows peaks that can be indexed on the basis of 2-dimensional hexagonal pore geometry. The unit cell parameter (α) was calculated using (2/√3) $d_{100}$, calculated values are in accordance with previous reports for this class of silica porous particles. The unit cell parameter and d-spacing for all silica particles are provided in Table 1. Pore structure was characterized by low-angle X-Ray diffraction (XRD) on a powder PANalytical diffractometer (PANalytical, Karlsruhe, Germany) operated at 45 kV and 40 mA, with 0.02° step size and equipped with Cu Kα radiation source and by Transmission Electron Microscopy (TEM) using a JEOL JEM-2100F instrument (JEOL Ltd., Tokyo, Japan) equipped with Schottky-type field emission gun.

Particle Size and Morphology

Figures 1D, 1E, 1F:
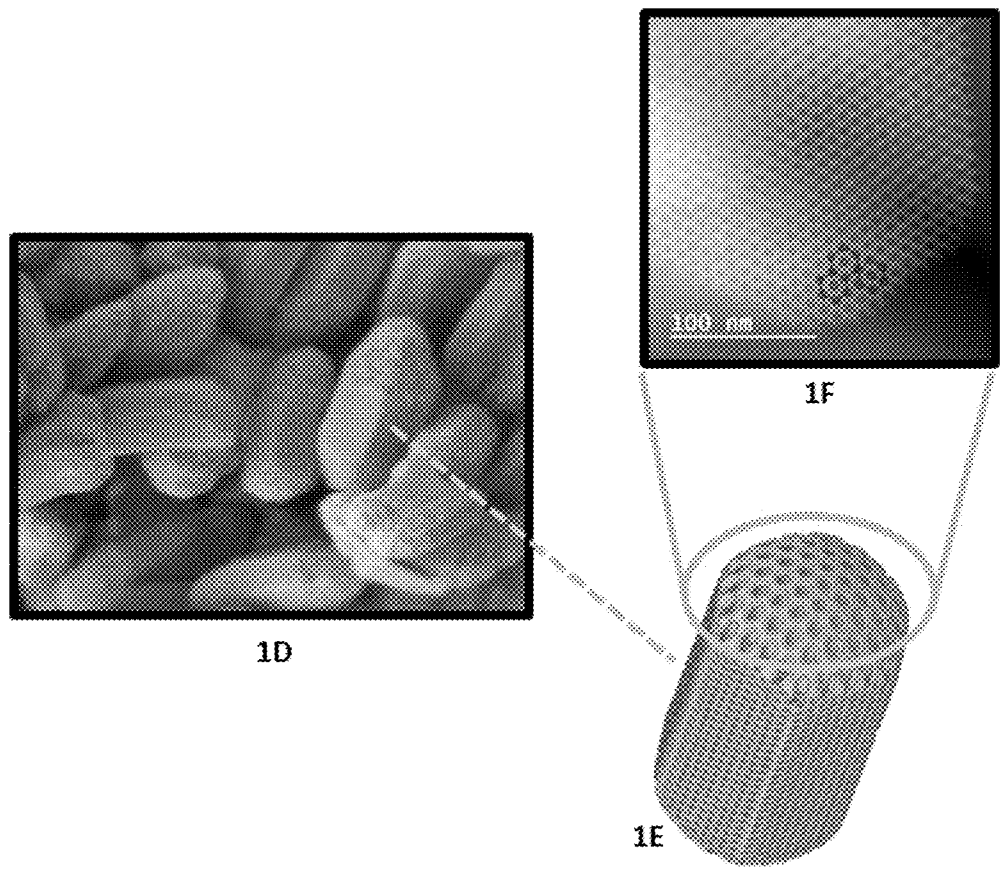
Figure 2:
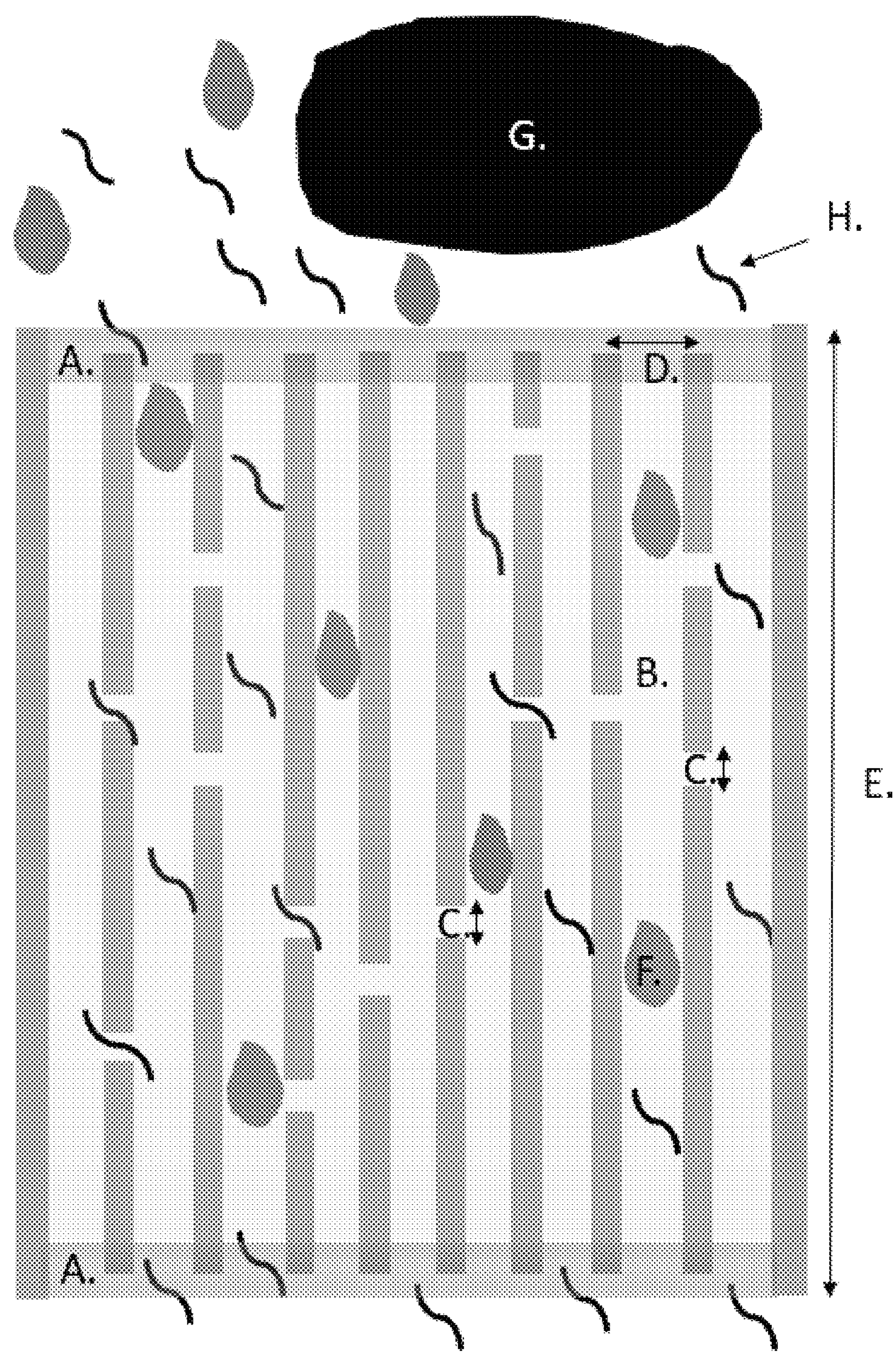
FIG. 2 is an illustration of the proposed mode of action of the invention. Upon ingestion, the porous silica particles mix with the food and the intestinal juices. In the digestive system, larger food molecules are broken down by enzymes into biomolecules small enough for the body to absorb. The intestinal content therefore contains both large and small molecules. The porous silica particle works as a molecular sieve by physically separating smaller molecules from larger ones through its tailored porosity. Only small molecules will diffuse into the mesopores as labelled. This physically separates a fraction of smaller biomolecules such as enzymes and metabolic products from larger undigested biomolecules. This separation is dependent on pore size and architecture (spatially ordered, cylindrical mesopores interconnected via narrowly elongated lateral pores) as well as the physiochemical properties of the material. Labels are as follows: A. Molecular Sieve, B. Physiochemical properties of material within particle, C. Narrowly elongated lateral pores, D. Spatially ordered, cylindrical mesopores, E. Silica particle, F. Small biomolecule (e.g. enzyme), G. Large molecule (e.g. undigested food particle), H. Water molecule.

Silica particle morphology was determined by SEM revealing large aggregates of several micrometers of individual rod-shaped particles (FIG. 1D). SEM micrographs were obtained using a JEOL JSM-7401F (JEOL Ltd., Tokyo, Japan) equipped with Schottky-type field emission gun was used to characterize the particle agglomerates and morphology. Furthermore, hydrodynamic particle size characterization was also performed using a nanosizer. Particles at a concentration of 0.38 (w/v) were dispersed in phosphate buffer of pH 7.3 or an aqueous solution of sodium chloride (0.2 M) and sonicated for 2-5 min to achieve a clear suspension. Particle size distribution was determined in a Malvern® Zetasizer Nano ZS (Malvern Instruments Ltd, Worcestershire, UK).

Tables 1 to 3: Material Characteristics

Various properties of synthesized silica material of batch SM0023 were systematically measured using above listed techniques with operational conditions. The features identified are described in Table 1 below.

TABLE I

| Parameter | Measured Values | Method |
|---|---|---|
| Appearance | White fine powder | Ph Eur 7.3 01/2011:0434 |
| Identification (Structure) | Test passed | Ph Eur 7.3 01/2011:0434 |
| Average particle size | 835 nm | DLS and/or SEM |
| % pores in 7.0-13.0 nm (1) | 66% | Gas Sorption Analysis |
| % Lateral pores (0.5-5.0 nm) (1) | 20% | Gas Sorption Analysis |
| Specific Surface Area | 687 $m^2/g$ | Gas Sorption Analysis |
| Pore Volume | 0.87 $cm^3/g$ | Gas Sorption Analysis |
| Assay | ≥99% | Ph Eur 7.3 01/2011:0434 |

(1) {Pore Volume or surface area (at 0.5-5.0 nm or 7.0-13.0 nm)/Total Pore Volume (single point) or Total Surface Area (BET Method)} × 100

In further experiments wherein multiple bulk samples of the material were obtained, the following features were observed in the range indicated (which other features of the material being substantially in accordance with those indicated for the sample referred to in Table 1 above):

TABLE 2

| Parameter | Measured Values | Method |
|---|---|---|
| Appearance | White or almost white fine powder | Ph Eur 7.3 01/2011:0434 |
| Average particle size | 539-1764 nm | DLS and/or SEM |
| % pores in 7.0-13.0 nm (1) | 50-61% | Gas Sorption Analysis |
| % Lateral pores (0.5-5.0 nm) (1) | 22-31% | Gas Sorption Analysis |
| Specific Surface Area | 795-1094 $m^2/g$ | Gas Sorption Analysis |
| Pore Volume | 0.79-1.27 $cm^3/g$ | Gas Sorption Analysis |

(1) {Pore Volume or surface area (at 0.5-5.0 nm or 7.0-13.0 nm)/Total Pore Volume (single point) or Total Surface Area (BET Method)} × 100

It is contemplated that in other experiments the following features might be observed:

TABLE 3

| Parameter | Measured Values | Method |
|---|---|---|
| Appearance | White fine powder | Ph Eur 7.3 01/2011:0434 |
| Identification (Structure) | Test passed | Ph Eur 7.3 01/2011:0434 |
| Average particle size | 835 nm | DLS and/or SEM |

TABLE 3-continued

| Parameter | Measured Values | Method |
|---|---|---|
| % pores in 7.0-13.0 nm [(1)] | 49% | Gas Sorption Analysis |
| % Lateral pores (0.5-5.0 nm) [(1)] | 28% | Gas Sorption Analysis |
| Specific Surface Area | 687 $m^2/g$ | Gas Sorption Analysis |
| Pore Volume | 0.87 $cm^3/g$ | Gas Sorption Analysis |
| Assay | ≥99% | Ph Eur 7.3 01/2011:0434 |

[(1)] {Pore Volume or surface area (at 0.5-5.0 nm or 7.0-13.0 nm)/Total Pore Volume (single point) or Total Surface Area (BET Method)} × 100

Example 2: Entrapment of Biomolecules by Silica In Vitro

The silica material according to Example 1 (batch SM0023) was tested on two biomolecules present in the human digestive system, pancreatic amylase and pancreatic lipase. The enzyme activity tests described herein are standard tests that can be found in the literature to measure the activity of digestive enzymes. In this example, the tests have been performed in vitro with the porcine versions of the enzymes. The example shows that interactions between the silica materials according to the invention entrap biomolecules such as digestive enzymes and consequently the remaining depleted solution has a lower enzyme activity (see FIG. 3).

α-Amylase Entrapment by SM0023

The effect of silica particles on digestion of carbohydrates was studied by detecting the activity of α-Amylase (see FIG. 3D). It has been tested in principle under two different conditions: (a) by co-incubating the silica particles together with the two essential components, α-Amylase (the enzyme, which is a small biomolecule) and starch (the substrate which is a larger molecule) or (b) when α-Amylase has been incubated alone with the silica particles first, followed by removing the pelleted silica particles and detection of the activity in the remaining supernatant thereafter. When protocol (a) has been tested, in some instances inhibition of α-Amylase activity has been observed. When protocol (b) is used, if the α-Amylase has been pre-incubated with silica particles of a specific pore size (9.6 nm) and with the correct physiochemical properties, then the α-Amylase activity remaining in the supernatant is reduced (see FIG. 3D).

By detecting the specific α-Amylase protein band of 54 kDa in a conventional Western blot assay, it can be concluded that the enzyme was removed from the solution after binding to SM0023 (FIG. 3D). Using an alternative method (Bicinchoninic acid (BCA) assay)) to measure α-Amylase protein concentration in the solution confirm that the enzyme was removed after being exposed to SM0023 (FIG. 3F). Equally importantly, reference silica batch SM0002 with physiochemical properties falling outside of the ranges required by the present invention (as prepared using techniques known to those in the art) do not markedly affect the amount of α-Amylase present in the solutions.

Figure 3:
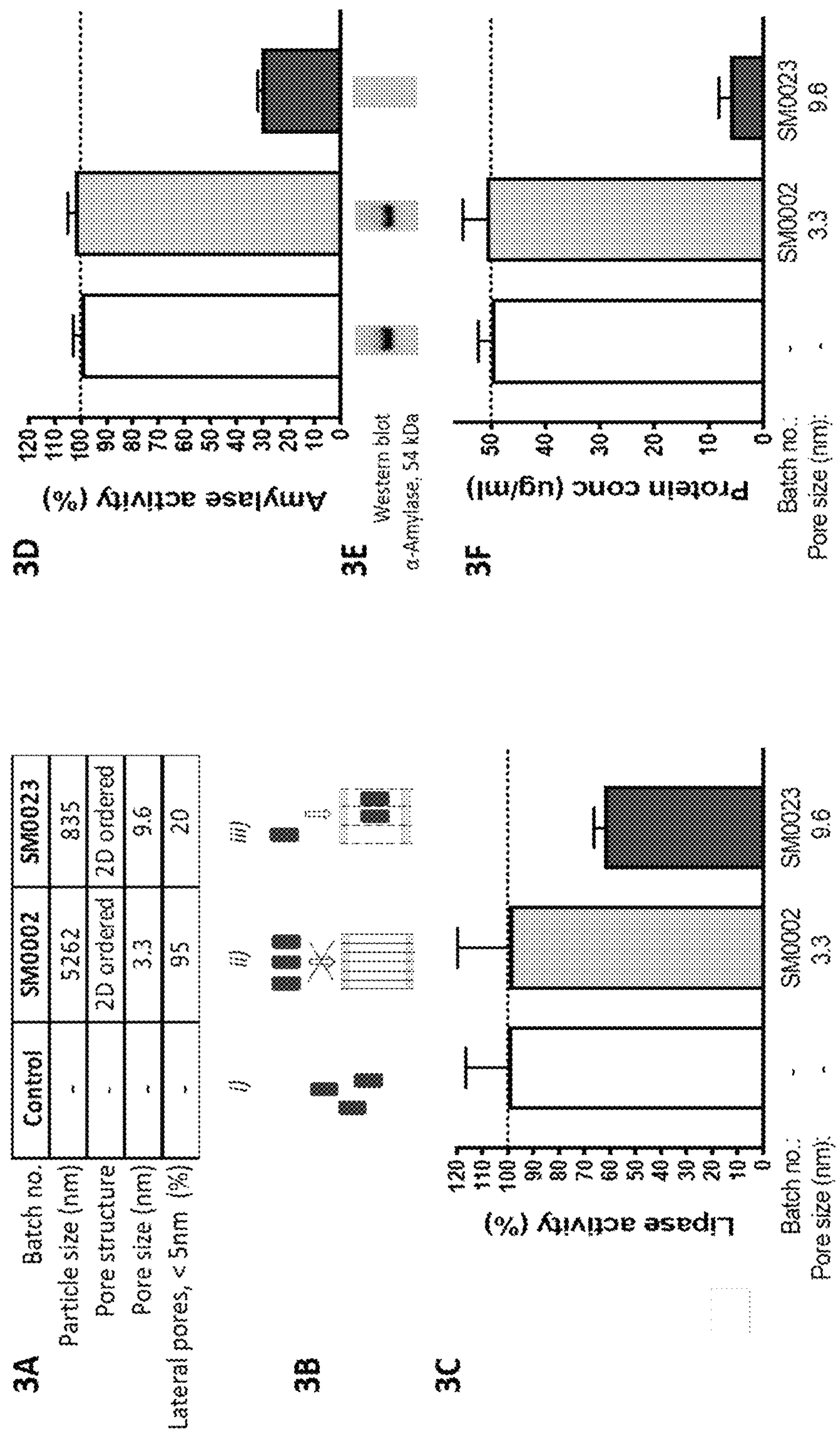
FIG. 3A. Two different types of silica are compared in order to exemplify that a combination of correct pore size and physiochemical properties is needed for efficient molecular sieve entrapment. In this small panel, when comparing to reference silica material SM0002, only silica from example 1, labelled as SM0023 has the right properties (as described herein) to allow for efficient entrapment of biomolecules (here enzymes).
FIG. 3B illustrates the principle of how silica pore size affects the entrapment of biomolecules. i) Free biomolecules, here exemplified by enzymes (■), can act unrestrained in the below enzyme in vitro assays. ii) When silica batch SM0002 is added to the reaction, the enzyme cannot enter due to pore size restriction. iii) Silica from example 1, herein also known as SM0023, has the right physiochemical properties for the enzymes to enter into the structure and stay in the structure. *see FIG. 3A and Table 1.
FIG. 3C. The Lipase assay illustrates how SM0023 with a pore size of 9.6 nm efficiently inhibits the Lipase enzyme (approx. dimensions 7×8×25 nm). In brief, the pH stat method was used by mixing freshly prepared Lipase extract (400 mg) in 1 ml tris-maleate buffer at pH 6.5 together with 8.3 mg of Silica batches SM0002 and SM0023. The samples were agitated and incubated at room temperature for 10 minutes before being centrifuged for 6 minutes at 1600 G. The supernatant was added to a digestion vessel containing the substrate tributyrin (6 g) dispersed in digestion buffer (9 mL). Throughout the digestion, NaOH (0.6 M) was titrated into the digestion vessel to maintain the pH at 6.5. The digestion was run for up to 10 mins and the volume of NaOH needed to keep the pH at 6.5 was measured (as the free fatty acids were released). The initial slope of NaOH (μmol) vs time (min) was normalized to the enzyme alone (white bar) tubes and expressed as percentage. Data is shown as means±standard deviation of 3 experiments. The method is also described in Phan, S. et al., *Journal of Pharmaceutical Sciences,* 104, 1311-1318 (2015).
FIG. 3D. The Amylase Absorption Assay exemplifies how SM0023 with a pore size of 9.6 nm efficiently entraps the α-Amylase enzyme (approx. dimensions 5×8×13 nm). In brief, a solution of silica (5 mg/mL) was mixed with an equal volume of porcine α-Amylase (0.1 mg/mL, PBS pH 5.4) and the mixture was incubated for 37° C. for 30 min with agitation. The samples were spun for 3 min and the supernatant was incubated for another 30 min together with soluble starch (2 mg/mL), following addition of 3,5-Dinitrosalicylic acid (DNS) and heating at 95 degrees for 15 min. DNS changes colour in the presence of reducing sugars (starch to maltose here) and is detected at 540 nm. The data is expressed as percentage, normalized to the enzyme alone (white bar) tubes. SM0002 and SM0023 are tested here in duplicate tubes, and data is shown as mean±standard error of the mean. The experiment has been repeated 3 times with identical results.
FIG. 3E. SM0023 depletes the biomolecules (enzyme in this context) from solution. Western blot staining with an anti-α-Amylase antibody shows that the supernatant in the above experiment (FIG. 3D) is depleted of α-Amylase (54 kDa) after treatment with SM0023. The silica with smaller (SM0002, 3.3 nm) pore sizes does not deplete the solution of the enzyme, since it does not have efficient physiochemical properties and cannot efficiently entrap the biomolecule.
FIG. 3F. SM0023 depletes the biomolecules (enzyme in this context) from solution. The QuantiPro BCA assay Kit (Sigma cat no. QPBCA) was utilized to measure the protein concentration of the supernatant in the above experiment (FIG. 3D) after treatment with SM0023. This data confirms the data in FIG. 3E that the amount of enzyme is substantially decreased. The silica with smaller (SM0002, 3.3 nm) pore sizes does not deplete the solution of the enzyme, since it does not have efficient physiochemical properties and cannot efficiently entrap the biomolecule. The data is expressed as protein concentration (μg/ml) after exposure to 1.25 mg/ml silica. SM0002 and SM0023 are tested here in duplicate tubes, and data is shown as mean±standard error of the mean.

The data in FIG. 3 can be seen as a model of how the silica acts as a molecular sieve by entrapping biomolecules, thus lowering the concentration of the free biomolecule and thereby lowering the overall enzymatic activity of the solution.

Lipase Entrapment—a Second Model Confirming the Mode of Action

The principle of biomolecule entrapment was confirmed with a second in vitro model system, namely that of pancreatic lipase degradation of a triglyceride substrate. In brief, a similar set-up was conducted by allowing the silica batches SM0002 and SM0023 to interact with lipase prior to a brief centrifugation and thereafter addition of a substrate in the form of tributyrin (FIG. 3C).

SM0023 inhibits the lipase activity in the remaining supernatant, whereas silica with other physiochemical properties does not achieve the same effect.

Example 3: Lowering the Immediate Energy Uptake In Vivo

Figure 4:
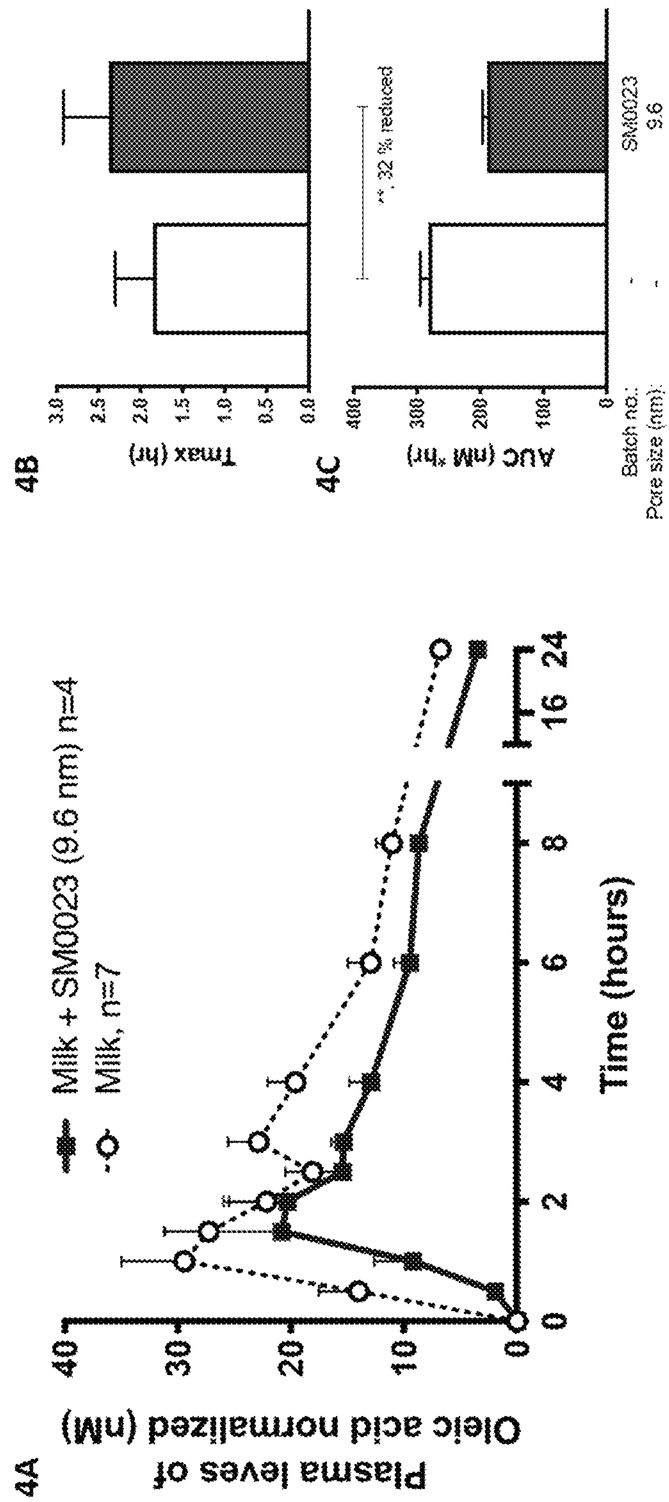
FIG. 4. SM0023 delays the absorption and exposure of 14C triolein in rats. (4A) Kinetic profiles of postprandial uptake of 14C oleic acid measure in rat plasma after 14C triolein was spiked to 3.5% full fat milk with or without SM0023 and subsequently delivered to rats by gavage (n=4-5/group). Data is expressed as mean±standard error of the mean. (4B). Calculations from the data in FIG. 4A to illustrate the delayed time to maximum plasma concentration (Tmax) of oleic acid, mediated by SM0023 and (4C) the oleic acid exposure shown here as area-under-the-curve (AUC) again calculated from FIG. 4A. Data is expressed as mean±standard error of the mean. The student T-test (assuming Gaussian distribution) was used to compare the groups. ** in figure=$p<0.01$.

Full fat milk (containing 3.5% fat) was spiked with 14C radiolabelled triolein and delivered to rats, followed by measuring the radioactivity in the plasma over 24 hours (FIG. 4). The results show a clear shift in the profile for the animals treated with SM0023 (FIG. 4A). Both a delay in early absorption of the biomolecule (FIG. 4B) as well as an overall lower exposure as illustrated by a significantly lower AUC can be seen (FIG. 4C). Treating the animals with SM0002 (with other physiochemical properties) in the same model does not show any effect, again underlining the importance of using silica particles with the correct physiochemical properties. This exemplifies that SM0023 has an effect detectable already at the level of absorption seen within 24 hours in a relevant model of lipid metabolism.

As for the protocol used, 1.5 mL of 3.5% full fat milk was spiked with 14-C radiolabelled triolein and sonicated (to incorporate the triolein into the fat droplets of the milk) followed by adding of 60 mg silica particles. Prior to the study the male Sprague Dawley rats were acclimatized for a minimum of 3 days. When the rats reached a weight between 250-300 grams, their right carotid artery was cannulised to allow for less stressful blood sampling. All rats were fasted for 8 hours prior to dose administration and 8 hours after dose administration.

Figure 5:
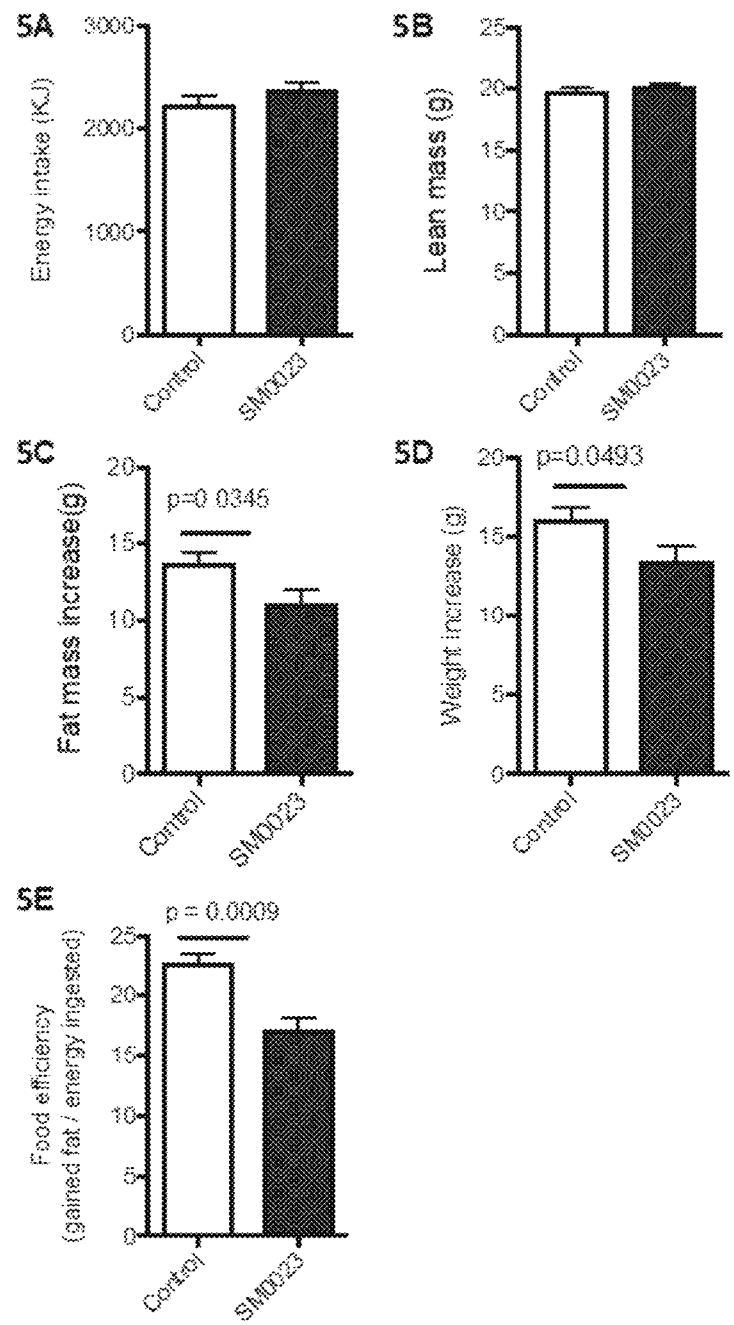
FIG. 5. SM0023 treatment changes long-term fat metabolism. In a metabolic mouse model, male C57BL/6 mice were fed high fat diet with or without 4% of SM0023 (n=7). (5A) Food intake was measured weekly. Total energy intake was calculated from food intake. (5B) Magnetic Resonance Imaging (MRI) measurements of lean body mass at the end of the study. (5C) MRI measurements also generate data on fat mass increase. (5D) Animals were weighed throughout the study and the data here show the mean increase±standard error of the mean after 7 weeks. (5E) Food efficiency over the 7 weeks of treatment, calculated as fat mass increase in gram multiplied by the energy content of 1 g fat (37 kJ/g) divided by kJ energy eaten, multiplied by 100 to obtain a percentage. Error bars represent standard error of the mean. The student T-test was used for statistical analysis.

Example 4: Lowering the Long-Term Adipose Tissue Formation and Food Efficacy In Vivo SM0023 treatment changes long-term fat metabolism. A metabolic mouse model of male C57BL/6 mice were fed high fat diet with or without 4% of SM0023 (n=7). The total energy intake was similar between the groups, suggesting that the treatment does not in itself affect the appetite of the animals (FIG. 5A) and measurements of lean mass were also similar between the groups (FIG. 5B). Measurements of "fat mass increase" on the other hand show a significantly lower level in the SM0023 treated animals (FIG. 5C). Animals were also weighed throughout the study and the data strikingly shows a significantly lower weight gain in the animals treated with SM0023 (FIG. 5D). The fact that the weight differences were due to differences in fat mass and not in lean weight confirms that mice treated with silica particles grew normally, showed by normal weight increase on organ and muscle mass, while the adipose tissue did not increase in the same extent as for the control animals. This indicates that the mice were healthy during the treatment. Finally, these data can be used to calculate the "food efficiency", defined as "fat mass increase" divided by "energy eaten" expressed as percentage (FIG. 5E). The "food efficiency" is also lower in the SM0023 treated animals, clearly showing that the treated animals have an altered energy metabolism leading to less fat being stored in their bodies as adipose tissue.

These data, combined with Examples 2 and 3, indicate that treatment with SM0023 lowers degradation of food and directly decreases biomolecule and energy uptake into the body, which secondarily lowers formation of adipose tissue in vivo.

As for the protocol details, nine weeks old male C57BL/6N mice (Scanbur, Sweden) were single caged and held under a 12 h:12 h light/dark cycle at thermo-neutral temperature, 30° C. with 50% humidity, at the animal facility at Stockholm University per standard protocol for animal husbandry. Mice had free access to their respective diets and water during the experiment. Food efficiency was calculated as fat weight gained in g multiplied by the energy content of 1 g fat (37 kJ/g) divided by the energy from food ingested, in kJ. This gives food efficiency as a unit-free rate, multiplying it by 100 gives the percentage of energy that gets stored as fat.

Example 5: Clinical Effects Seen of Silica Particles on Reduction in Metabolic and Cardiovascular Risk Factors A pilot study in human subjects with both normal weight and obese male volunteers was performed using several batches of silica (each prepared according to the process set out in Example 1 and each conforming to the parameters as required by the present invention). The aim of the study was to evaluate safety, tolerability and feasibility of dosing regimen. 10 normal weight and 10 obese subjects were enrolled.

After signature on the written consent, medical examination, questions regarding eating habits, sleep patterns, living conditions and digestive health and blood and faces sampling, both the normal weight and obese subjects (Group A and Group B) received placebo capsules during study days 1-5 (five day run-in period). Thereafter all subjects received porous silica as set out in the schedule below.

Dosage of Porous Silica

Study days 6-9 (4 days): 1 g before breakfast, lunch and dinner.

Study days 10-14 (5 days): 2 g before breakfast, lunch and dinner.

Study days 15-21 (7 days): 3 g before breakfast, lunch and dinner.

Upon successful completion of the initial dosing regimen, Group B continued with a dosing regimen of 3 g three times daily, a daily total intake of 9 grams. The treatment was continued for 10 additional weeks, i.e. in total 12 weeks treatment.

The adverse events reported were unrelated to the treatment. No changes in bowel and GI function was detected. In addition, blood levels of vitamins, trace elements and hormones were not affected. A decrease in cholesterol and blood lipids was observed but the main finding was the unexpected effect seen on HbA1c. HbA1c is glycated haemoglobin and this acts as a marker for long-term glucose exposure. HbA1c levels were measured using a Siemens DCA Vantage Analyser, using techniques known to those skilled in the art.

Figure 6A:
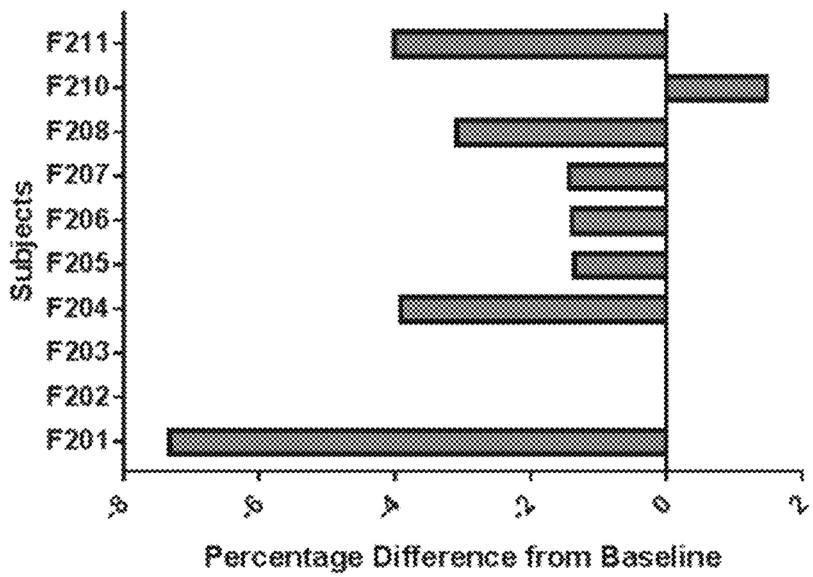

A statistically significant decrease of HbA1c levels were seen after 12 weeks of treatment with silica material of the present invention in obese male volunteers (see FIG. 6A). As neither fasting plasma glucose nor fasting insulin were statistically significantly altered it indicates that the reduction in HbA1c is due to reduction in postprandial levels.

No deaths, no study discontinuations and no serious adverse events were reported. Adverse events observed were mild and did not result in discontinuation. In summary, there were fewer related AEs in the obese compared to those of normal weight, and all were mild and transient.

Biochemistry (Summarized in Table 4)

In Normal weight/Group A the change from baseline was statistically significant for Cholesterol 4.5 to 4.1 mmol/L (p=0.04) and LDL 2.7 to 2.4 mmol/L (p=0.04) after 3 weeks of treatment.

Figure 6B:
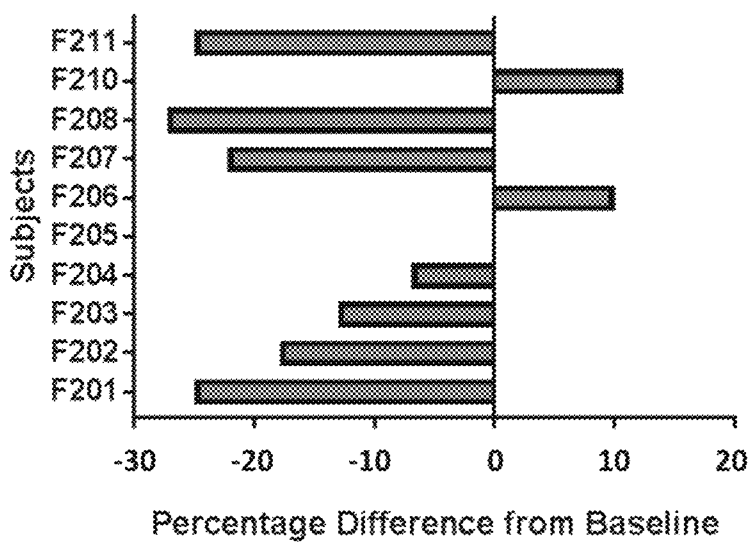

In the Obese/Group B (see FIGS. 6A and 6B) the change from baseline was statistically significant for LDL from 2.6 to 2.3 mmol/L (p=0.001) after 3 weeks of treatment. The change from baseline was still statistically significant after 12-week treatment, with LDL to 2.2 mmol/L (p=0.03) (FIG. 6B), LDL/HDL from 2.2 to 1.8 (p=0.02) and HbA1c from 34.7 to 33.0 mmol/mol (p=0.04) (FIG. 6A) after 12-week treatment. FIG. 6 shows % reduction over time from baseline.

TABLE 4

The effects on blood lipids and HbA1c of silica particles as prepared according to Example 1 in human male volunteers

| Mean | | Baseline | Week 3 | P-value | Week 12 | P-value |
|---|---|---|---|---|---|---|
| Cholesterol | Normal | 4.5 | 4.1 | 0.04 | — | — |
| (mmol/L) | Obese | 4.3 | 4.2 | 0.24 | 3.9 | 0.13 |
| LDL | Normal | 2.7 | 2.4 | 0.04 | — | — |
| (mmol/L) | Obese | 2.6 | 2.3 | 0.001 | 2.2 | 0.03 |
| LDL/HDL | Normal | 2.1 | 2.1 | 1.0 | — | — |
| | Obese | 2.2 | 1.9 | 0.05 | 1.8 | 0.02 |
| HbA1c | Normal | 31.9 | 32.1 | 0.62 | — | — |
| (mmol/mol) | Obese | 34.7 | 34.1 | 0.14 | 33.0 | 0.04 |

The invention claimed is:

1. A porous silica particle characterized by having a hierarchical pore structure wherein:

(a) at least about 20% of the pores of the silica particle are mesopores of a size in the range of from about 7.0 to about 13.0 nm; and (b) at least about 10% of the pores of the silica particle are lateral pores of a size in the range of from about 0.5 to about 5.0 nm, and by having a particle size of from about 0.1 μm to about 10.0 μm.

2. The porous silica particle of claim 1, wherein:

(a) at least about 25% of the pores of the silica particle are mesopores of a size in the range of from about 9.0 to about 12.0 nm; and (b) at least about 10% of the pores of the silica particle are lateral pores of a size in the range of from about 0.5 to about 5.0 nm.

3. The porous silica particle of claim 1, wherein:

(a) at least about 25% of the pores of the silica particle are mesopores of a size in the range of from about 9.0 to about 11.0 nm; and (b) at least about 15% of the pores of the silica particle are lateral pores of a size in the range of from about 0.5 to about 5.0 nm.

4. The porous silica particle of claim 1, wherein the particle has a BET surface area of at least about 500 $m^2/g$.

5. The porous silica particle of claim 4, wherein the particle has a BET surface area of from about 500 to about 1500 $m^2/g$.

6. The porous silica particle of claim 5, wherein the particle has a BET surface area of from about 600 to about 1200 $m^2/g$.

7. The porous silica particle of claim 1, wherein the particle has a substantially non-spherical morphology.

8. The porous silica particle of claim 7, wherein the particle has an essentially rod-shaped morphology.

9. The porous silica particle of claim 1, wherein the particle has a particle size of from about 0.5 to about 5.0 μm.

10. The porous silica particle of claim 1, having an average pore size of the pores in the range from about 7.0 to about 13.0 nm.

11. The porous silica particle of claim 1, having an average pore size of the pores in range from about 9.0 to about 11.0 nm.

12. The porous silica particle of claim 1 comprising surface hydroxyl groups, wherein the surface hydroxyl groups of the silica particle are unmodified.

13. The porous silica particle of claim 12, wherein:

(i) the surface hydroxyl (OH) groups are in an amount of from about 0.5 to about 7.0 per $nm^2$; and (ii) the surface hydroxyl (OH) groups have two distinct $pK_a$ values being at a first $pK_a$ of from 3.5 to 4.2 and at a second $pK_a$ of from 8.0 to 8.7.

14. The porous silica particle of claim 1, wherein the pores in the range 5.0 to 50.0 nm are structurally ordered.

15. A pharmaceutical composition comprising a plurality of silica particles wherein at least 50% of the silica particles are as claimed in claim 1, and optionally one or more pharmaceutically acceptable excipient, colorant and/or flavouring.

16. A method for the treatment or prophylaxis of a metabolic disease or disorder, comprising administering to a patient in need thereof a therapeutically effective amount of a silica particle as claimed in claim 1.

17. A method as claimed in claim 16, wherein the treatment or prophylaxis of a metabolic disease or disorder is:

(a) the reduction of metabolic and/or cardiovascular risk-factors of type 2 diabetes;

(b) the treatment or prophylaxis of type 2 diabetes;

(c) the treatment or prophylaxis of prediabetes;

(d) the treatment or prophylaxis of metabolic syndrome;

(e) the treatment or prophylaxis of obesity;

(f) the lowering of, or prevention of increase in, body fat levels in the form of adipose tissue;

(g) the lowering of, or prevention of increase in, triglyceride and/or cholesterol levels; and (h) the treatment or prophylaxis of dyslipidaemia.

18. A method of lowering the efficiency of a food or drink item, comprising administering with said food or drink a silica particle as claimed in claim 1.

19. A method for separation of a fraction of (typically small) biomolecules, such as enzymes and metabolic products, including lipid complexes, carbohydrate and proteins, from undigested food in the digestive system, comprising administering a silica particle as claimed in claim 1.

20. A process for the preparation of porous silica particles as claimed in claim 1 comprising the steps of:

(i) forming a homogenous mixture of (a) an organic pore-forming material, and (b) a source of silica, in an aqueous solution at non-neutral pH, optionally at elevated temperature, such as at a temperature of from about 20° C. to about 60° C.; then (ii) curing the mixture formed in step (i) by maintaining at increased temperature, such as a temperature of from about 70° C. to about 150° C. for at least 3 hours; then (iii) removing the solid material from the cured mixture formed in step (ii) and washing the solid material to neutral pH; then optionally (iv) removing organic material.

* * * * *